(12) United States Patent
Yamada et al.

(10) Patent No.: US 9,146,703 B2
(45) Date of Patent: Sep. 29, 2015

(54) STORAGE MEDIUM, INFORMATION PROCESSING APPARATUS, INFORMATION PROCESSING SYSTEM AND INFORMATION PROCESSING METHOD

(75) Inventors: Yoichi Yamada, Kyoto (JP); Hidemaro Fujibayashi, Kyoto (JP); Ryo Tanaka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 768 days.

(21) Appl. No.: 13/204,959

(22) Filed: Aug. 8, 2011

(65) Prior Publication Data

US 2012/0256966 A1    Oct. 11, 2012

(30) Foreign Application Priority Data

May 19, 2011   (JP) ................... 2011-112650

(51) Int. Cl.
| | |
|---|---|
| G09G 5/00 | (2006.01) |
| G06F 3/14 | (2006.01) |
| H04N 5/44 | (2011.01) |
| H04N 5/85 | (2006.01) |
| G06F 3/0486 | (2013.01) |
| A63F 13/40 | (2014.01) |
| G06T 1/60 | (2006.01) |
| G06T 3/40 | (2006.01) |

(Continued)

(52) U.S. Cl.
CPC .............. *G06F 3/1446* (2013.01); *A63F 13/10* (2013.01); *G06F 3/0486* (2013.01); *H04N 5/4403* (2013.01); *H04N 5/85* (2013.01); *A63F 2300/308* (2013.01); *G06F 3/0346* (2013.01); *G06F 3/04845* (2013.01); *G06T 1/60* (2013.01); *G06T 3/40* (2013.01)

(58) Field of Classification Search
CPC ............ G06F 3/04845; G06F 3/04812; G06F 3/0486; G06T 1/60; G06T 3/40
USPC ........... 345/173, 94, 472, 551, 592, 440, 157, 345/473, 8, 107, 63, 88, 676
See application file for complete search history.

(56) References Cited

U.S. PATENT DOCUMENTS

| | | |
|---|---|---|
| 5,726,687 A | 3/1998 | Belfore et al. |
| 5,767,851 A | 6/1998 | Yee et al. |

(Continued)

FOREIGN PATENT DOCUMENTS

| | | |
|---|---|---|
| JP | 2008123158 | 5/2008 |
| JP | 2010257160 | 11/2010 |
| KR | 10-2010-0057215 | * 6/2010 |

OTHER PUBLICATIONS

Wii (registered trademark) Toriatsukai Setsumeisho Kinou-hen (Japanese User's Manual for Functions) p. 7 (released on Dec. 2, 2006)), with a partial English translation, 4 pages.

(Continued)

*Primary Examiner* — Abderrahim Merouan
(74) *Attorney, Agent, or Firm* — Nixon & Vanderhye PC

(57) ABSTRACT

One of a plurality of areas is displayed as a display area on a display device, and based on an input from an input section, an object included in the display area is determined as a target to be moved, and when a predetermined movement is detected by a movement sensor, the currently displayed display area is switched to an area different from the currently displayed display area, and the area is displayed on the display device together with the object determined as a target to be moved.

19 Claims, 30 Drawing Sheets

(51) Int. Cl.
*G06F 3/0484* (2013.01)
*G06F 3/0346* (2013.01)

(56) References Cited

U.S. PATENT DOCUMENTS

| | | | |
|---|---|---|---|
| 6,281,897 B1* | 8/2001 | Berry et al. | 715/784 |
| 7,585,225 B2* | 9/2009 | Minagawa | 463/33 |
| 7,833,096 B2* | 11/2010 | Sakaguchi et al. | 463/31 |
| 8,452,339 B2* | 5/2013 | Lee et al. | 455/566 |
| 2006/0094502 A1* | 5/2006 | Katayama et al. | 463/31 |
| 2006/0258455 A1* | 11/2006 | Kando | 463/36 |
| 2007/0050726 A1* | 3/2007 | Wakai et al. | 715/769 |
| 2007/0124503 A1* | 5/2007 | Ramos et al. | 709/248 |
| 2007/0157089 A1* | 7/2007 | Van Os et al. | 715/702 |
| 2008/0132334 A1* | 6/2008 | Nonaka et al. | 463/37 |
| 2008/0146328 A1* | 6/2008 | Ishii et al. | 463/31 |
| 2009/0143138 A1* | 6/2009 | Miyamoto et al. | 463/31 |
| 2009/0164930 A1* | 6/2009 | Chen et al. | 715/769 |
| 2009/0241038 A1 | 9/2009 | Izuno et al. | |
| 2010/0188344 A1* | 7/2010 | Shirakawa et al. | 345/173 |
| 2010/0251152 A1* | 9/2010 | Cho et al. | 715/765 |
| 2010/0275150 A1* | 10/2010 | Chiba et al. | 715/784 |
| 2011/0018821 A1* | 1/2011 | Kii | 345/173 |
| 2011/0312389 A1* | 12/2011 | Hyun et al. | 455/566 |
| 2012/0235926 A1* | 9/2012 | Sip | 345/173 |

OTHER PUBLICATIONS

Kobayashi et al., "Boomerang: Suspendable Drag-and-Drop Interactions Based on a Throw-and-Catch Metaphor", Proceedings of the 20$_{th}$ Annual ACM Symposium on User Interface Software and Technology, UIST '07, Jan. 1, 2007, pp. 187-190.

"Ambermoon (Game Manual)" Jan. 1, 1993, http://gamesdbase.com/Media/SYSTEM/Commodore__Amiga//Manual/formated/Ambermoon__-__1993__-__Thalion-Software.pdf, 109 pages, with a partial English translation, 1 page.

English version of Ambermoom game manual, Oct. 7, 2008, 50 pages.

* cited by examiner

FIG. 8
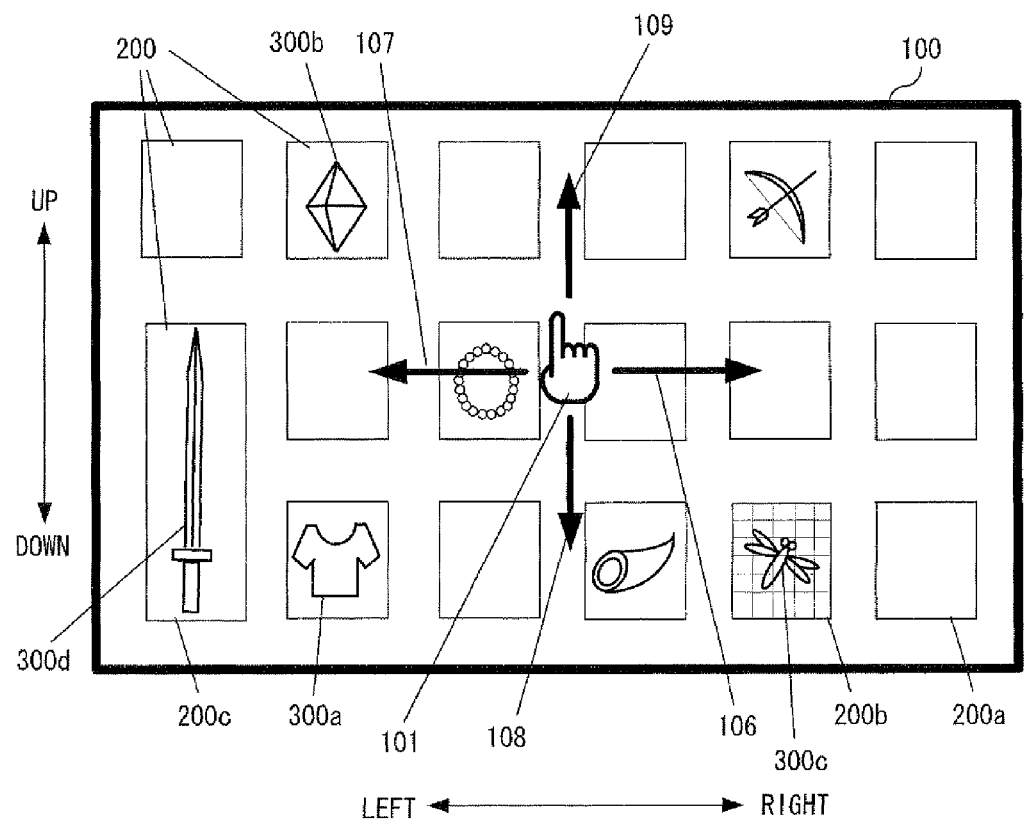
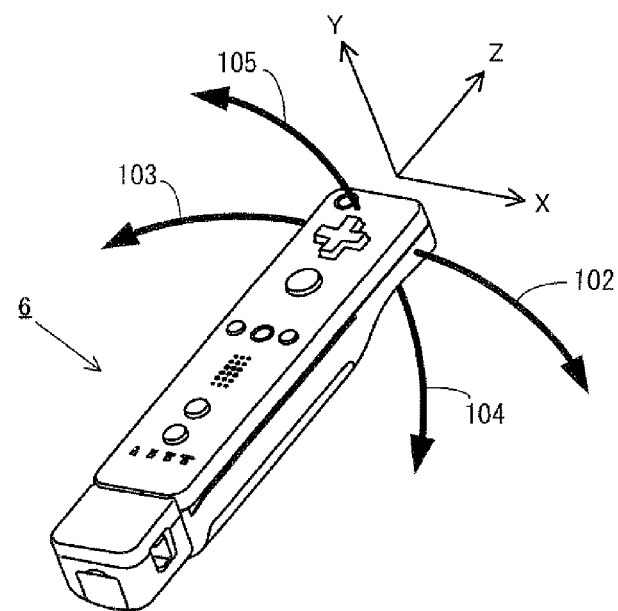

200a  300a  101   DISPLAY AREA A
                  (CURRENTLY DISPLAYED)

300a  101   DISPLAY AREA A
            (CURRENTLY DISPLAYED)

STORAGE MEDIUM, INFORMATION PROCESSING APPARATUS, INFORMATION PROCESSING SYSTEM AND INFORMATION PROCESSING METHOD

CROSS REFERENCE TO RELATED APPLICATION

The disclosure of Japanese Patent Application No. 2011-112650, filed on May 19, 2011, is incorporated herein by reference.

BACKGROUND OF THE INVENTION

1. Field of the Invention

The present invention relates to a storage medium, an information processing apparatus, an information processing system and an information processing method, and more particularly, to a storage medium, an information processing apparatus, an information processing system and an information processing method for performing display control of objects.

2. Description of the Background Art

Conventionally, in a situation where objects such as items are managed on a plurality of screens, in order to move an item among the plurality of screens, a method has been used in which, for example, a selected item is moved to an end of a screen and moved to another screen, or an item is moved to one screen to another by performing a button operation (for example, see Wii (registered trademark) Toriatsukai Setsumeisho Kinou-hen (Japanese User's Manual for Functions) page 7 (released on Dec. 2, 2006)).

However, according to the above conventional art, after selecting an item which is a target to be moved, in order to perform an operation to move the selected item from a screen to another, a plurality of buttons provided on a controller or button icons displayed on the screen need to be operated. That is, in order to move a desired item from a screen to another, a user is required to perform a plurality of button operations. Consequently, in the conventional art, such operations can be bothersome to the user.

SUMMARY OF THE INVENTION

Therefore, a main object of the present invention is to provide a storage medium and the like having stored therein an information processing program, which allows a user to perform an operation to select an item (object) and move the item to another screen (display area) intuitively with improved operability.

In order to achieve the above object, the present invention has the following features.

The present invention is a computer-readable storage medium having stored therein an information processing program executed by a computer of an information processing apparatus for controlling an object displayed on a display device based on inputs from a movement sensor for detecting a movement and an input section. The information processing program causes the computer to function as display means, object determination means, and display switching means. The display means displays one of a plurality of areas on the display device as a display area. The object determination means determines an object included in the display area as a target to be moved based on an input from the input section. The display switching means, when a predetermined movement is detected by the movement sensor, switches to another area different from the display area currently displayed as a new display area and displays the other area on the display device together with the object determined as a target to be moved by the object determination means.

According to the above, by selecting an object which the user intends to move by operating the input section and performing an operation of causing the movement sensor to detect a movement, the user can move the object to a display area currently not being displayed on the display device. Accordingly, the user can perform an operation of selecting an object and moving the object to another display area not currently displayed by intuitively with improved operability.

Further, the information processing program may cause the computer to further function as object cancelling means for, based on an input from the input section, cancelling a determination, made by the object determination means, of the object as being a target to be moved; and object positioning means for, when the determination is cancelled by the object cancelling means, positioning the object with respect to which the determination is cancelled in the new display area.

According to the above, the object is no longer a target to be moved when the display area is switched, and thus the user can promptly perform an operation of moving another object.

Alternatively, the information processing program may cause the computer to further function as object moving means for, based on an input from the input section, moving the object determined as a target to be moved within the display area, and the display switching means may, when switching the currently displayed display area to the new display area and displaying the new display area on the display device together with the object determined as a target to be moved, display the object determined as a target to be moved at a position in the new display area which is the same position as a position of the object determined as a target to be moved in the currently displayed display area.

According to the above, by operating the input section, the user can move the object determined as a target to be moved freely within the display area. Further, the object determined as a target to be moved is displayed at the same position before and after the display area is switched, and thus the user can be prevented from losing sight of the object determined as a target to be moved when the display area is switched.

Alternatively, the object positioning means may, when the determination is cancelled by the object cancelling means, position the object with respect to which the determination is cancelled at a position, in the new display area, associated with a position of the object at a time when the object is determined as a target to be moved by the object determination means.

According to the above, the object determined as a target to be moved is positioned automatically at a position, in the new display area, associated with a position in an area before the switching in which the object has been positioned. Accordingly, the user does not need to perform a cumbersome operation when moving the object so as to position the object in a positioning area.

Alternatively, the object positioning means may, when the determination is cancelled by the object cancelling means, position the object with respect to which the determination is cancelled at a position, in the new display area, associated with a position of the object determined as a target to be moved in the currently displayed display area immediately before switching the currently displayed display area to the new display area.

According to the above, the object determined as a target to be moved is positioned automatically at a position, in a new display area, associated with a position of the object at a time when an operation of switching the display area is performed.

Accordingly, based on a position at which an operation of switching the display area is performed, the user can determine a position at which the object determined as a target to be moved is positioned in the new display area.

Alternatively, the object positioning means may, when the determination is cancelled by the object cancelling means, position the object with respect to which the determination is cancelled at a position, in the new display area, associated with a position of the object determined as a target to be moved in the new display area.

According to the above, the user can position the object determined as a target to be moved at a position associated with the position of the object determined as a target to be moved in the new display area. Accordingly, typically, when the user moves the object determined as a target to be moved freely in the new display area, a position at which the object determined as a target to be moved exists is determined as an "associated position," thereby allowing the object determined as a target to be moved to be positioned at the associated position.

Alternatively, at least one positioning area in which the object can be positioned may be set in each of the plurality of areas, and the object positioning means may, when the determination is cancelled by the object cancelling means, position the object with respect to which the determination is cancelled in a positioning area, in the new display area, associated with a positioning area in a display area before switching, in which the object determined as a target to be moved has been positioned.

According to the above, when an object is moved from an area to another area having a different layout of positioning areas, the object is positioned automatically in a positioning area associated with a positioning area before movement. Accordingly, the user does not need to perform a cumbersome operation of moving an object so as to position the object in a positioning area.

Alternatively, at least one positioning area in which the object can be positioned may be set in each of the plurality of areas, and the object positioning means may, when the determination is cancelled by the object cancelling means, position the object with respect to which the determination is cancelled in a positioning area, in the new display area, associated with a position of the object determined as a target to be moved in the currently displayed display area immediately before switching the currently displayed display area to the new display area.

According to the above, the object determined as a target to be moved is positioned automatically in a positioning area, in a new display area, associated with a position of the object determined as a target to be moved at a time when an operation of switching the display area is performed. Accordingly, in accordance with a position at which an operation of switching the display area is performed, the user can determine a positioning area in which the object determined as a target to be moved is positioned in a new display area.

Alternatively, at least one positioning area in which the object can be positioned may be set in each of the plurality of areas, and the object positioning means may, when the determination is cancelled by the object cancelling means, position the object with respect to which the determination is cancelled in a positioning area, in the new display area, associated with a position of the object determined as a target to be moved in the new display area.

According to the above, the user can position the object determined as a target to be moved in a positioning area, in a new display area, associated with a position of the object determined as a target to be moved. Accordingly, typically, when the user moves an object determined as a target to be moved freely in a new display area, for example, the user can determine a positioning area in which the object determined as a target to be moved exists as an "associated positioning area" and position the object determined as a target to be moved in the positioning area.

Alternatively, the information processing program may cause the computer to further function as object identification means for identifying a type of the object, and the object positioning means may, when the determination is cancelled by the object cancelling means, position the object with respect to which the determination is cancelled at a position, in the new display area, associated with the type of the object with respect to which the determination is cancelled.

According to the above, when the display area is switched, an object which has been moved is positioned automatically at a position associated with a type of the object. Accordingly, the user does not need to perform a cumbersome operation of moving an object so as to position the object at a position associated with the type of the object.

Alternatively, the object determination means may fix the object while the object is determined as a target to be moved, and the display switching means may, when a predetermined movement is detected by the movement sensor, switch to an other area different from a currently displayed display area as a new display area, in a state where the object determined as a target to be moved is fixed.

According to the above, an object determined as a target to be moved is not moved when the display area is switched, and thus the user can be prevented from losing sight of the object determined as a target to be moved.

Alternatively, the information processing apparatus may control the object based on inputs from a first input device having the movement sensor and the input section.

According to the above, by operating the input section of the first input device so as to select an object which the user intends to move and performing an operation of moving the first input device, the user can move the object to a display area currently not being displayed. At this time, this operation is similar to a human action of grasping a stuff and moving the stuff to another position. Accordingly, the user can select an object and move the object to another display area currently not being displayed intuitively with improved operability.

Alternatively, the plurality of areas may be associated with each other in advance in a predetermined sequence, and the display switching means may, when a predetermined movement is detected by the movement sensor, switch to an area associated with the currently displayed display area as a new display area and displays the area on the display device together with the object determined as a target to be moved.

According to the above, the display area is switched based on a predetermined sequence, and thus the user can switch the display area in accordance with the predetermined sequence, and thereby perform an operation of switching the display area with improved operability assuming the predetermined sequence.

Alternatively, the display switching means may, when the predetermined movement detected by the movement sensor is a movement in a first direction, switch to an area which is associated with a currently displayed display area so as to immediately follow the currently displayed display area as a new display area and display the area on the display device together with the object determined as a target to be moved, and when the predetermined movement detected by the movement sensor is a movement in a second direction, switch to an area which is associated with the currently displayed display area so as to immediately precede the currently displayed display area as a new display area and display the area on the display device together with the object determined as a target to be moved.

According to the above, the user can switch to a new display area and display the new display area, which can be different in accordance with a direction of a moving operation.

Alternatively, the information processing apparatus may control the object displayed on the display device based on an movement input from a second input device having an additional movement sensor for detecting a movement, and the display switching means may, when a predetermined movement is detected by the movement sensor, switch to an area which is associated with a currently displayed display area so as to immediately follow the currently displayed display area as a new display area and display the area on the display device together with the object determined as a target to be moved, and when the predetermined movement is detected by the additional movement sensor, switch to an area which is associated with the currently displayed display area so as to immediately precede the currently displayed display area as a new display area and display the area on the display device together with the object determined as a target to be moved.

According to the above, the user can perform an operation of switching the display area by holding two input devices with his/her right hand and left hand, respectively. Accordingly, when playing a game or the like in which these two input devices are used, the user can switch the display screen with improved operability by using these two input devices.

Alternatively, the input section may include a pointing device, and the object determination means may determine, based on an input from the pointing device, an object included in the display area as a target to be moved.

According to the above, the user can determine an object as a target to be moved by using a pointing device, and thus the user can determine the object as a target to be moved and switch the display area with improved operability.

Alternatively, the movement sensor may detect at least one of an acceleration and an angular velocity, and the display switching means may, when an acceleration or an angular velocity which is greater than or equal to a predetermined value is detected by the movement sensor, switch to an other area different from a currently displayed display area as a display area and displays the other area on the display device together with the object determined as a target to be moved by the object determination means.

According to the above, a switching operation can be performed by detecting a movement using an acceleration or an angular velocity.

In the above description, the present invention is configured as a storage medium having stored therein an information processing program. However, the present invention may be configured as an information processing apparatus, an information processing system, or an information processing method.

According to the present invention, it is possible to provide a storage medium and the like having stored therein an information processing program, and the like for allowing the user to perform an operation of selecting an item (object) and moving the item to another screen (display area) intuitively with improved operability.

These and other objects, features, aspects and advantages of the present invention will become more apparent from the following detailed description of the present invention when taken in conjunction with the accompanying drawings

BRIEF DESCRIPTION OF THE DRAWINGS

FIG. 8 illustrates an operation of moving a pointer 101 displayed on a screen 100 of a monitor 2 by using the unit-equipped controller 6;

DESCRIPTION OF THE PREFERRED EMBODIMENTS

Figure 1:
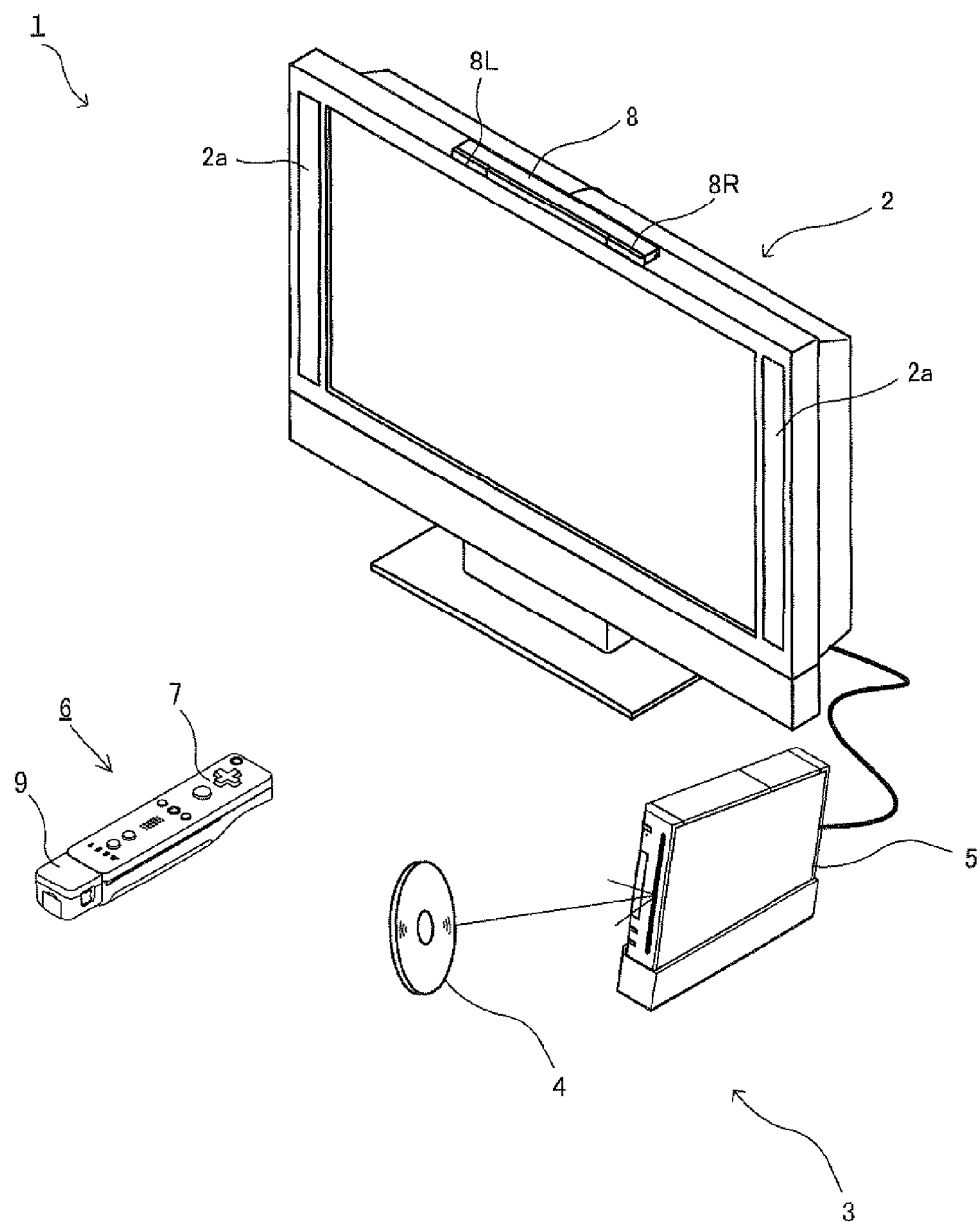
FIG. 1 is an outer appearance illustrating a game system 1 according to one embodiment of the present invention.
Figure 2:
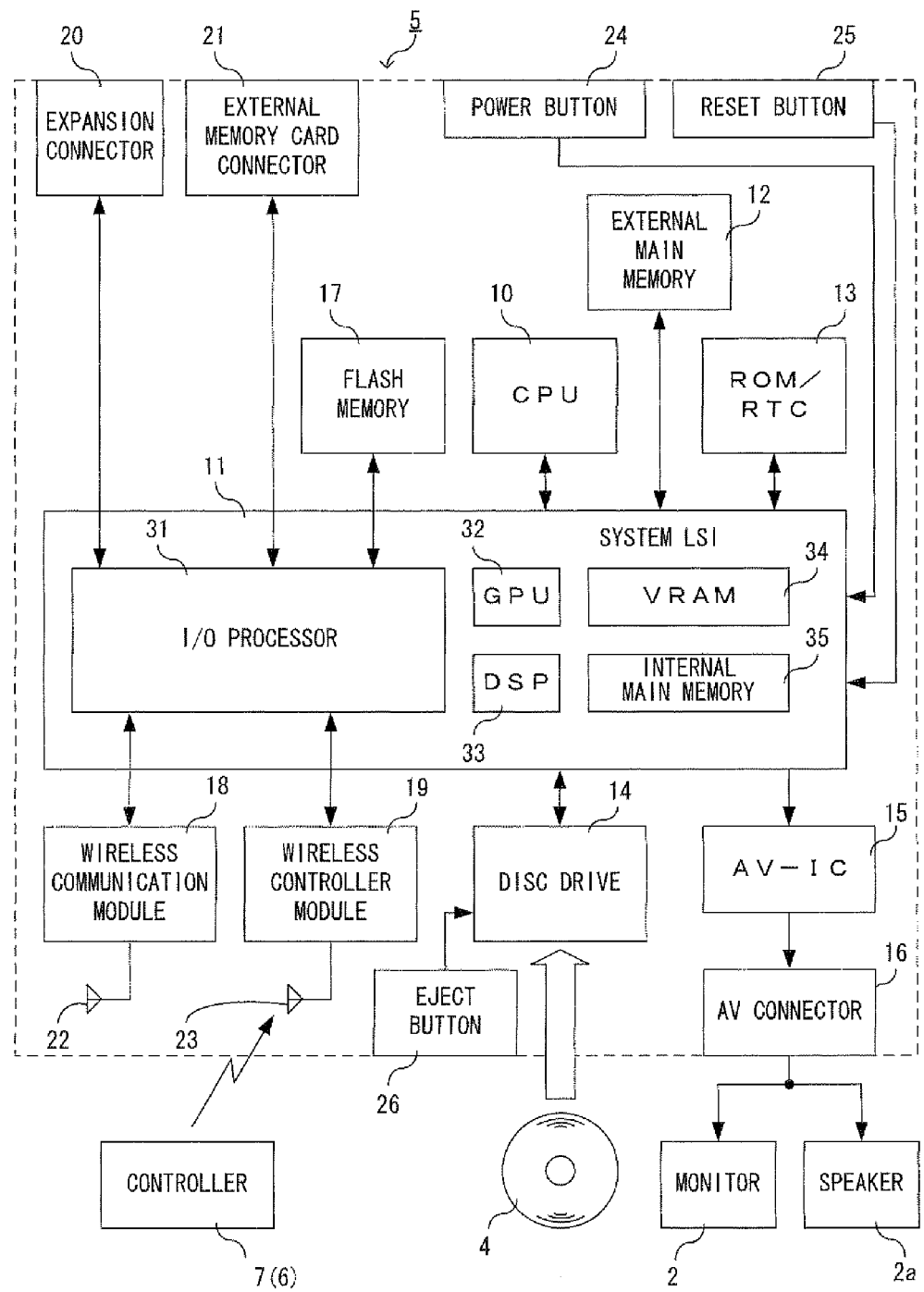
FIG. 2 is a functional block diagram of a game apparatus body 5 shown in FIG. 1.

With reference to FIG. 1, a game apparatus for executing a game program according to one embodiment of the present invention will be described. Hereinafter, for the same of specific explanation, a game system including a stationary game apparatus body 5 will be described as an example. FIG. 1 is an outer appearance of a game system 1 including a stationary game apparatus 3. FIG. 2 is a block diagram of the game apparatus body 5. Hereinafter, the game system 1 will be described.

[Overall Structure of Game System]

As shown in FIG. 1, the game system 1 includes a home television receiver (hereinafter referred to as a monitor) 2, which is exemplary display means, and a stationary game apparatus 3 which is connected to the monitor 2 via a connection cord. The monitor 2 includes speakers 2a for outputting sound based on an audio signal outputted from the game apparatus 3. Further, the game apparatus 3 includes an optical disc 4 having stored thereon a game program, which is an exemplary game program of the present invention, the game apparatus body 5 including a computer for executing the game program stored on the optical disc 4 so as to output and display a game screen on the monitor 2, and a unit-equipped controller 6 for providing the game apparatus body 5 with operational information necessary for a game in which an object or the like displayed on the game screen is operated.

The game apparatus body 5 incorporates therein a wireless controller module 19 (see FIG. 2). The wireless controller module 19 receives data wirelessly transmitted from the unit-equipped controller 6, and also transmits data from the game apparatus body 5 to the unit-equipped controller 6 (controller 7), thereby connecting the unit-equipped controller 6 and the game apparatus body 5 via wireless communication. Further, the optical disc 4, which is an exemplary information storage medium exchangeably used to the game apparatus body 5, is detachably inserted into the game apparatus body 5.

The game apparatus body 5 also incorporates therein a flash memory 17 (see FIG. 2) which functions as a backup memory for fixedly storing data such as save data. When a game program or the like stored on the optical disc 4 is executed, the game apparatus body 5 displays a result of the execution as a game image on the monitor 2. Further, the game program or the like need not be necessarily stored on the optical disc 4, but may be stored in advance in the flash memory 17 and executed. Still further, the game apparatus body 5 uses save data stored in the flash memory 17 so as to reproduce a state of a game played in the past, thereby displaying an image of the game on the monitor 2. A player playing with the game apparatus 3 can enjoy the game by operating the unit-equipped controller 6 while watching the image of the game displayed on the monitor 2.

The unit-equipped controller 6 provides the game apparatus body 5 with operation data indicative of details of an operation performed with respect to the unit-equipped controller 6. In the present embodiment, the unit-equipped controller 6 includes the controller 7 and angular velocity detection unit 9. Although details will be described later, the unit-equipped controller 6 is configured such that the angular velocity detection unit 9 is detachably connected to the controller 7.

The controller 7 uses a technology of Bluetooth (registered trademark), for example, and wirelessly transmits transmission data such as operation information to the game apparatus body 5 incorporating therein the wireless controller module 19. The controller 7 has a housing which is small enough to be held by one hand, and a plurality of operation buttons (including a cross key, a stick, and the like) exposed at a surface of the housing. As described later in detail, the controller 7 includes an imaging information calculation section 74 for taking an image as viewed from the controller 7. As exemplary imaging targets of the imaging information calculation section 74, two LED modules 8L and 8R (hereinafter referred to as markers 8L and 8R) are provided in the vicinity of the display screen of the monitor 2. The markers 8L and 8R, for example, output infrared light forward from the monitor 2, respectively. Further, in the controller 7, the communication section 75 receives transmission data wirelessly transmitted from the wireless controller module 19 of the game apparatus body 5, whereby sound or vibration based on the transmission data is generated.

[Internal Configuration of Game Apparatus Body 5]

Next, with reference to FIG. 2, an internal configuration of the game apparatus body 5 will be described. FIG. 2 is a block diagram showing a configuration of the game apparatus body 5. The game apparatus body 5 has a CPU (Central Processing Unit) 10, a system LSI (Large Scale Integration) 11, an external main memory 12, an ROM/RTC (Read Only Memory/

Real Time Clock) 13, a disc drive 14, an AV-IC (Audio Video-Integrated Circuit) 15, and the like.

The CPU 10 performs a game process by executing a game program stored on the optical disc 4, and acts as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes such as control of data transmission among component parts connected to the system LSI 11, generation of an image to be displayed, and acquisition of data from external devices. An internal configuration of the system LSI 11 will be described later. The external main memory 12, which is a volatile memory, stores therein such a program as a game program loaded from the optical disc 4 or a game program loaded from the flash memory 17, and various data. The external main memory 12 is used as a work area or a buffer area of the CPU 10. The ROM/RTC 13 has a ROM (so called a boot ROM) incorporating a program for booting up the game apparatus body 5, and a clock circuit (RTC) for counting time. The disc drive 14 reads program data, texture data, and the like from the optical disc 4, and writes the read data into an internal main memory 35 to be described later or the external main memory 12.

Further, provided to the system LSI 11 are an input/output processor 31, a GPU (Graphics Processor Unit) 32, a DSP (Digital Signal Processor) 33, a VRAM (Video RAM) 34, and the internal main memory 35. Although not shown in drawings, these component parts 31 to 35 are connected to one another via an internal bus.

The GPU 32 functions as a part of drawing means, and generates an image in accordance with a graphics command (draw command) from the CPU 10. The VRAM 34 stores therein data (such as polygon data and texture data) necessary for the GPU 32 to execute the graphics command. When an image is to be generated, the GPU 32 uses data stored in the VRAM 34 and generates image data.

The DSP 33 functions as an audio processor, and generates audio data by using sound data and sound waveform (tone quality) data stored in the internal main memory 35 or the external main memory 12.

The image data and the audio data generated as described above are read by the AV-IC 15. The AV-IC 15 outputs the read image data to the monitor 2 via the AV connector 16, and also outputs the read audio data to the speakers 2a provided on the monitor 2. Accordingly, the image is displayed on the monitor 2, and the sound is outputted from the speakers 2a.

The input/output (I/O) processor 31 executes transmission of data between component parts connected to the I/O processor 31, and also executes downloading of data from external devices. The I/O processor 31 is connected to the flash memory 17, the wireless communication module 18, the wireless controller module 19, an expansion connector 20, and an external memory card connector 21. An antenna 22 is connected to the wireless communication module 18, and antenna 23 is connected to the wireless controller module 19.

The I/O processor 31 is connected to a network via the wireless communication module 18 and the antenna 22, and is capable of communicating with another game apparatus and various servers connected to the network. The I/O processor 31 accesses the flash memory 17 on a regular basis so as to detect data, if any, which is necessary to be transmitted to the network. If the data is detected, the detected data is transmitted to the network via the wireless communication module 18 and the antenna 22. The I/O processor 31 receives data transmitted from another game apparatus and data downloaded from a download server, via the network, the antenna 22, and the wireless communication module 18, and stores the received data in the flash memory 17. The CPU 10 executes the game program, and reads the data stored in the flash memory 17 to be used while executing the game program. In the flash memory 17, not only data transmitted between the game apparatus body 5 and another game apparatus or various servers, but also save data (result data or progress data) of a game played by using the game apparatus body 5 may be stored.

The I/O processor 31 also receives operation data and the like, which is transmitted from the controller 7 (unit-equipped controller 6) via the antenna 23 and the wireless controller module 19, and (temporarily) stores the operation data in the internal main memory 35 or in the buffer area of the external main memory 12. As with the external main memory 12, the internal main memory 35 may be used for storing the game programs read from the optical disc 4 or from the flash memory 17, and various data, and may be used as the work area or the buffer area of the CPU 10.

The expansion connector 20 and the external memory card connector 21 are connected to the I/O processor 31. The expansion connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 31 accesses the external storage medium via the expansion connector 20 or the external memory card connector 21, and then saves data or reads data.

Provided to (for example, on the front main surface of) the game apparatus body 5 are a power button 24 for the game apparatus body 5, a reset button 25 for a game process, an insertion slot in which the optical disc 4 is inserted, an eject button 26 for causing the optical disc 4 to be ejected from the insertion slot of the game apparatus body 5, and the like. The power button 24 and the reset button 25 are connected to the system LSI 11. When the power button 24 is turned on, power is supplied to each of the component parts of the game apparatus body 5 via an AC adaptor, which is not shown. When the reset button 25 is pressed, the system LSI 11 reboots the boot-up program of the game apparatus body 5. The eject button 26 is connected to the disc drive 14. When the eject button 26 is pressed, the optical disc 4 is ejected from the disc drive 14.

[Configuration of Unit-Equipped Controller 6]

Figure 3:
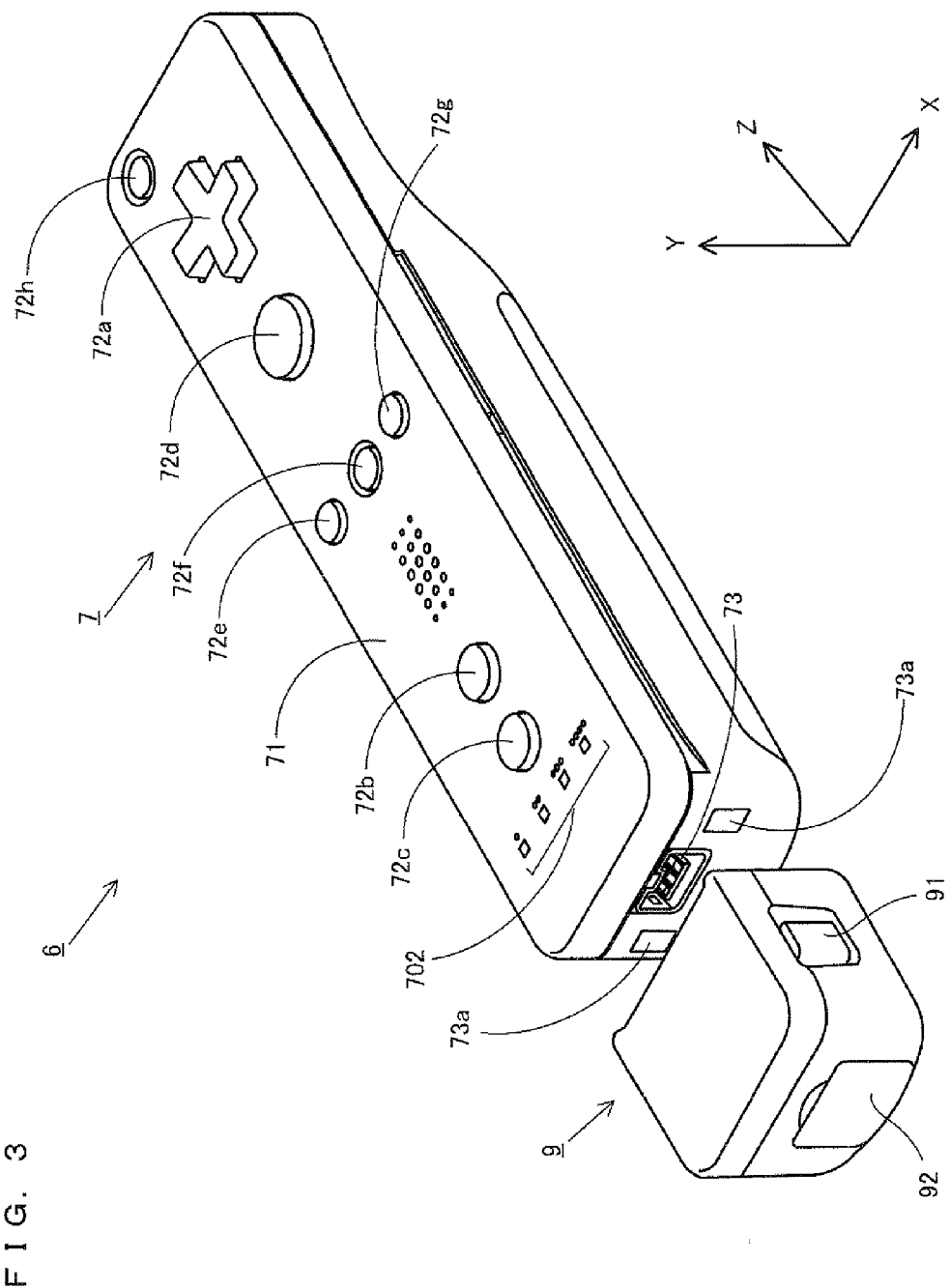
FIG. 3 is a perspective view of a unit-equipped controller 6 as viewed from a top rear side thereof shown in FIG. 1.
Figure 4:
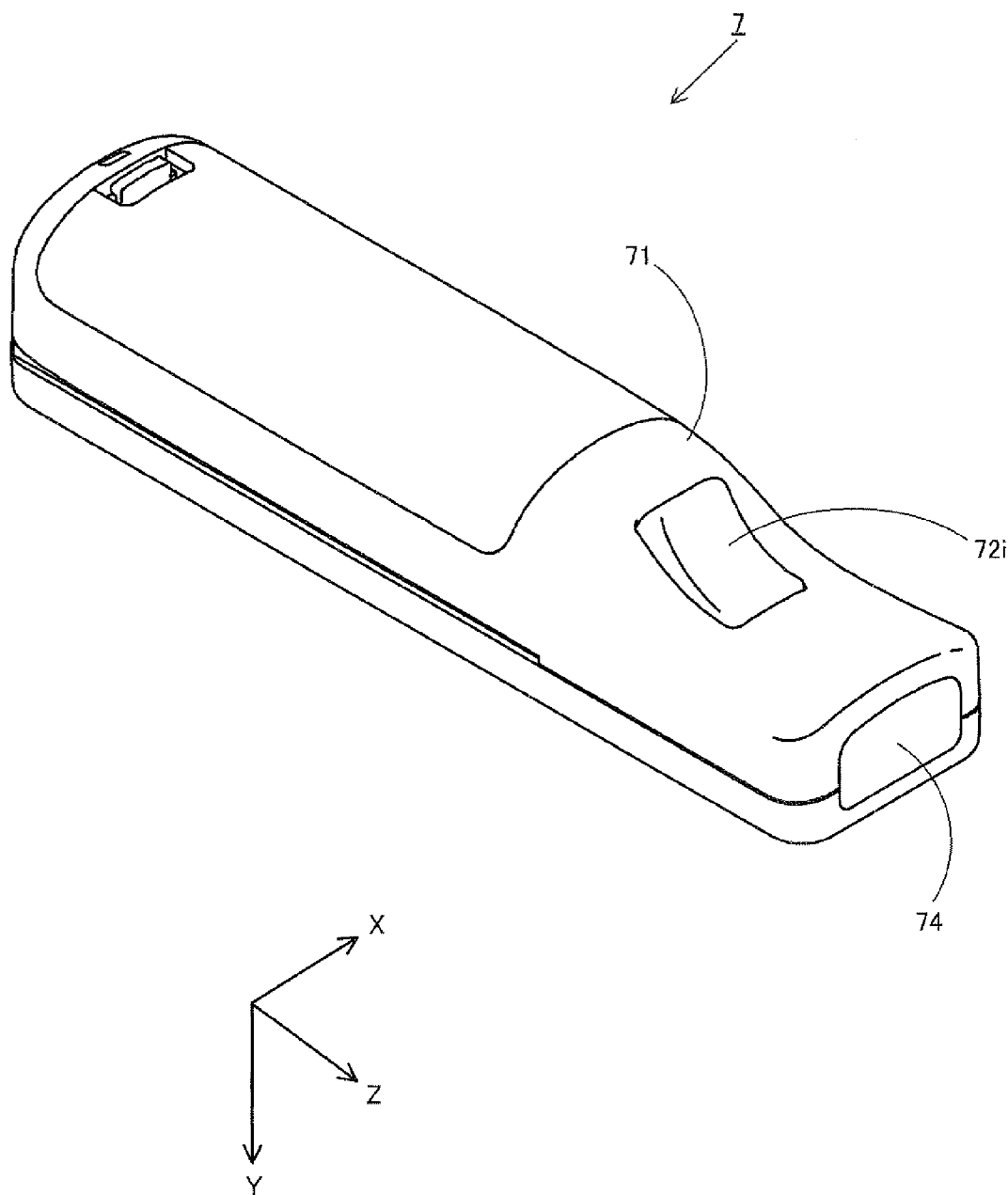
FIG. 4 is a perspective view of a controller 7 as viewed from a bottom front side thereof shown in FIG. 3.

Next, with reference to FIGS. 3 and 4, the unit-equipped controller 6 will be described. FIG. 3 is an exemplary perspective view of the unit-equipped controller 6 as viewed from a top rear side thereof. FIG. 4 is an exemplary perspective view of the controller 7 as viewed from a bottom front side thereof.

As shown in FIGS. 3 and 4, the controller 7 includes a housing 71 which is formed by plastic molding, for example, and a plurality of operation sections 72 are provided on the housing 71. The housing 71 has a substantially parallelepiped shape extending in a longitudinal direction from front to rear, and an overall size thereof is small enough to be held by one hand of an adult or even of a child.

At a front center portion of a top surface of the housing 71, a cross key 72a is provided. The cross key 72a is a cross-shaped four direction push switch, and operation portions thereof are respectively located on cross-shaped projecting portions arranged at intervals of 90 degrees such that the operation portions correspond to four directions (front, rear, right, and left). A player selects one of the front, rear, right, and left directions by pressing one of the operation portions of the cross key 72a. Through an operation of the cross key 72a, the player can indicate a direction in which a player character or the like appearing in a virtual game world is to move, or select an instruction from a plurality of choices.

The cross key 72a is an operation section for outputting an operation signal in accordance with the direction input operation performed by the player as described above, and the operation section may be provide in another form. For example, the operation section may be provided such that four push switches are arranged in the cross directions and an operation signal is outputted by the player's pressing one of the four push switches. Further, in addition to the four push switches, a center switch may be provided at a crossing portion of the above-described cross directions so as to provide an operation section composed of the four push switches and a center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and outputs an operation signal in accordance with an sliding direction of the disc-shaped member. Still alternatively, the cross key 72a may be replaced with a touchpad.

Behind the cross key 72a on the top surface of the housing 71, a plurality of operation buttons 72b to 72g are provided. The operation buttons 72b to 72g are each an operation section for outputting an operation signal assigned thereto when the player presses a head thereof. For example, functions such as a No. 1 button, a No. 2 button, and an A button and the like are assigned to the operation buttons 72b to 72d. Further, functions such as a minus button, a home button, a plus button and the like are assigned to the operation buttons 72e to 72g. Various operation functions are assigned to these operation buttons 72a to 72g in accordance with the game program executed by the game apparatus body 5. In an exemplary arrangement shown in FIG. 3, the operation buttons 72b to 72d are arranged in a line at the center in a front-rear direction on the top surface of the housing 71. Further, the operation buttons 72e to 72g are arranged in a line on the top surface of the housing 71 in a left-right direction between the operation buttons 72b and 72d. The operation button 72f has a top surface thereof buried in the top surface of the housing 71 to reduce the possibility of inadvertent pressing by the player.

In front of the cross key 72a on the top surface of the housing 71, an operation button 72h is provided. The operation button 72h is a power switch for turning on and off the power to the game apparatus body 5 by remote control. The operation button 72h also has a top surface thereof buried in the top surface of the housing 71 to reduce the possibility of inadvertent pressing by the player.

Behind the operation button 72c on the top surface of the housing 71, a plurality of LEDs 702 is provided. A controller type (number) is assigned to the controller 7 so as to be distinguishable from another controller 7. For example, the LEDs 702 may be used to provide a player a visual indication of the controller type assigned to the controller 7. Specifically, a signal is transmitted, from the wireless controller module 19 to the controller 7, so as to light a LED corresponding to the above-described controller type among the plurality of LEDs 702.

On the top surface of the housing 71, speaker holes for emitting sound from a speaker (a speaker 706 shown in FIG. 5), which is to be described later, are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller with one hand and points a front portion thereof to the markers 8L and 8R. On a slope surface of the recessed portion, an operation button 72i is provided. The operation button 72i is an operation section acting as, for example, a B button.

On a front surface of the housing 71, an image pickup element 743 constituting a part of an imaging information calculation section 74 is provided. The imaging information calculation section 74 is a system which analyzes image data picked up by the controller 7, identifies a high brightness area in the image, and detects the center of gravity and a size or the like of the area. For example, the imaging information calculation section 74 has a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable. In the case of the exemplary unit-controller 6 shown in FIG. 1 and FIG. 3, the angular velocity detection unit 9 is detachably connected to the rear surface of the controller 7 via the connector 73.

For the sake of detail explanation, a coordinate system set for the unit-equipped controller 6 (controller 7) will be defined. As shown in FIGS. 3 and 4, an X-axis, a Y-axis, and a Z-axis which are perpendicular to one another are defined with respect to the unit-equipped controller 6 (controller 7). Specifically, a longer direction, which is the front-rear direction, of the housing 71 is defined as the Z-axis, and a direction toward the front surface (a surface on which the imaging information calculation section 74 is provided) of the controller 7 is defined as a Z-axis positive direction. An up-down direction of the controller 7 is defined as the Y-axis, and a direction toward the top surface (a surface on which the operation button 72a is provided) of the housing 71 is defined as a Y-axis positive direction. Further, the left-right direction of the controller 7 is defined as the X-axis direction, and a direction toward the right side surface (a side surface shown in FIG. 3) of the housing 71 is defined as an X-axis positive direction.

Figure 7:
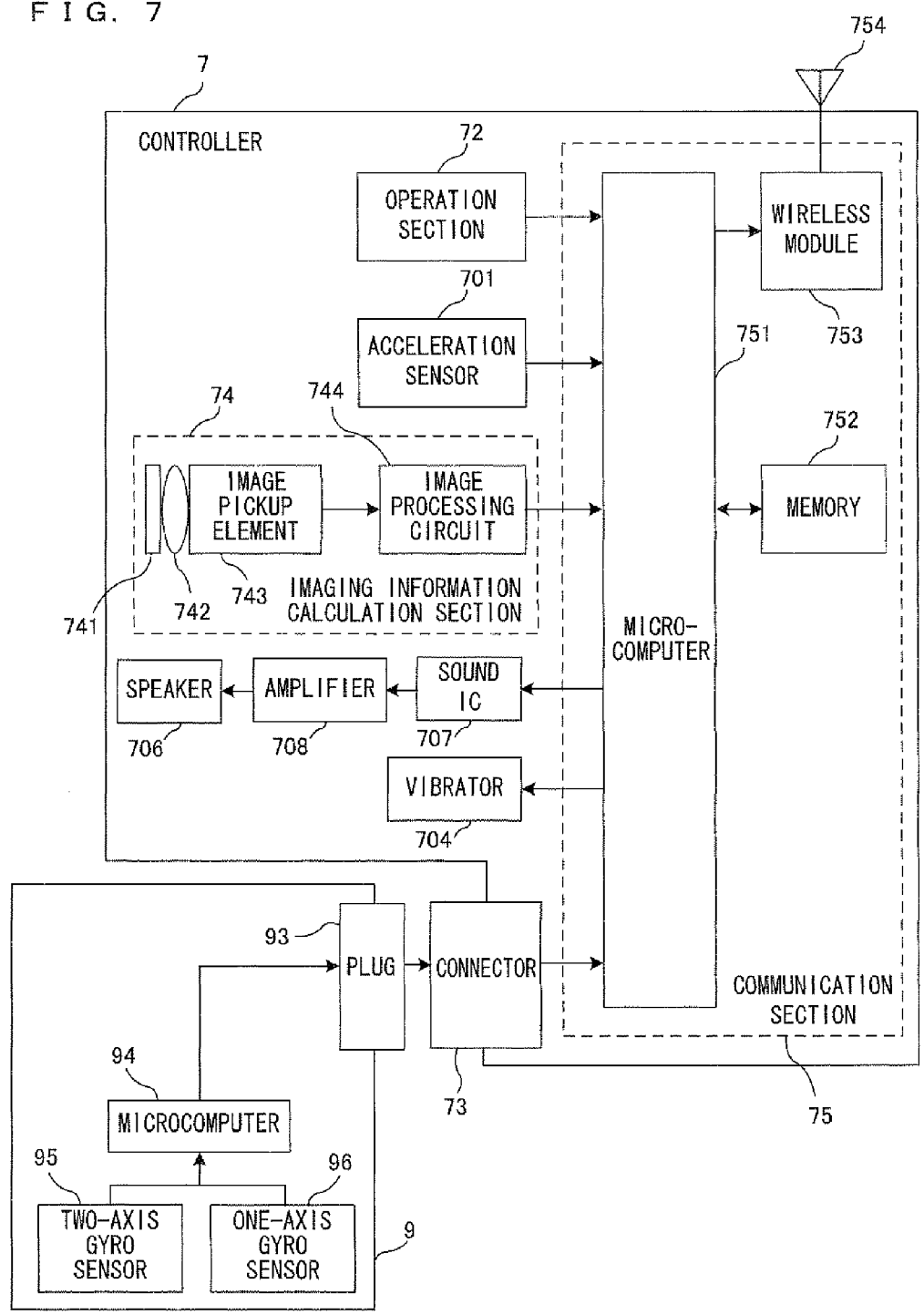
FIG. 7 is a block diagram showing a configuration of the unit-equipped controller 6 shown in FIG. 3.

The angular velocity detection unit 9 includes gyro sensors (a two-axis gyro sensor 95 and a one-axis gyro sensor 96 shown in FIG. 7) for detecting angular velocities around three axes. At a front edge of the angular velocity detection unit 9 (an edge on the Z-axis positive direction side shown in FIG. 3), a plug (plug 93 shown in FIG. 7) connectable to the connector 73 is provided. Further hooks (not shown) are provided on both sides of the plug 93, respectively. When the angular velocity detection unit 9 is mounted to the controller 7, the plug 93 is connected to the connector 73, and the hooks engage in locking holes 73a of the controller 7. Accordingly, the controller 7 and the angular velocity detection unit 9 are firmly fixed to each other. Further, the angular velocity detection unit 9 has a button 91 on each side surface (surfaces facing toward the X-axis direction shown in FIG. 3). The buttons 91 are configured such that when the buttons 91 are pressed, the hooks are disengaged from the locking holes 73a. Therefore, when the plug 93 is removed from the connector 73 while the buttons 91 are being pressed, the angular velocity detection unit 9 can be disconnected from the controller 7.

Accordingly, the player can operate the controller 7 having the angular velocity detection unit 9 mounted thereto, or operate the controller 7 only by removing the angular velocity detection unit 9 therefrom.

Provided at a rear edge of the angular velocity detection unit 9 is a connector having the same shape as the connector 73. Thus, an apparatus mountable to (the connector 73 of) the controller 7 is also mountable to the rear edge connector of the angular velocity detection unit 9. In FIG. 3, a cover 92 is detachably mounted to the rear edge connector.

[Internal Configuration of Controller 7]

Figure 5:
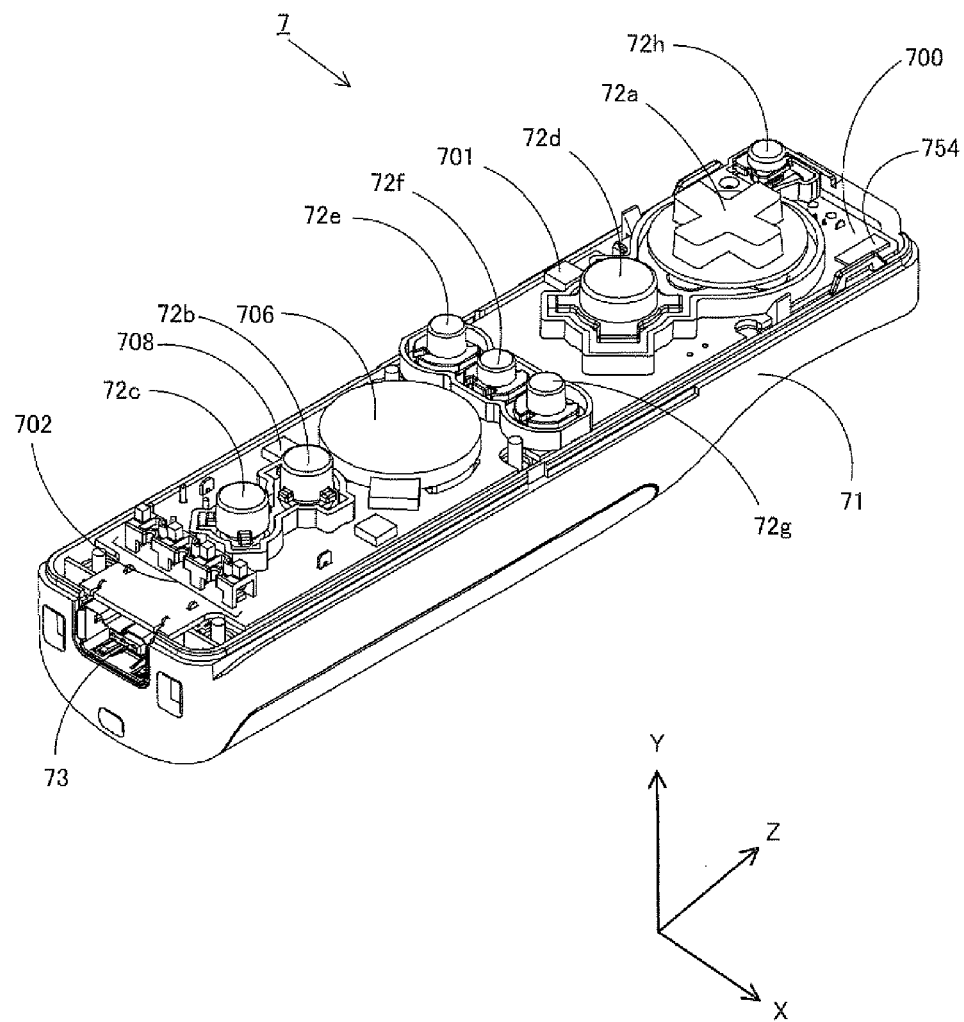
FIG. 5 is a perspective view of the controller 7 shown in FIG. 3 in a state where an upper housing thereof is removed.
Figure 6:
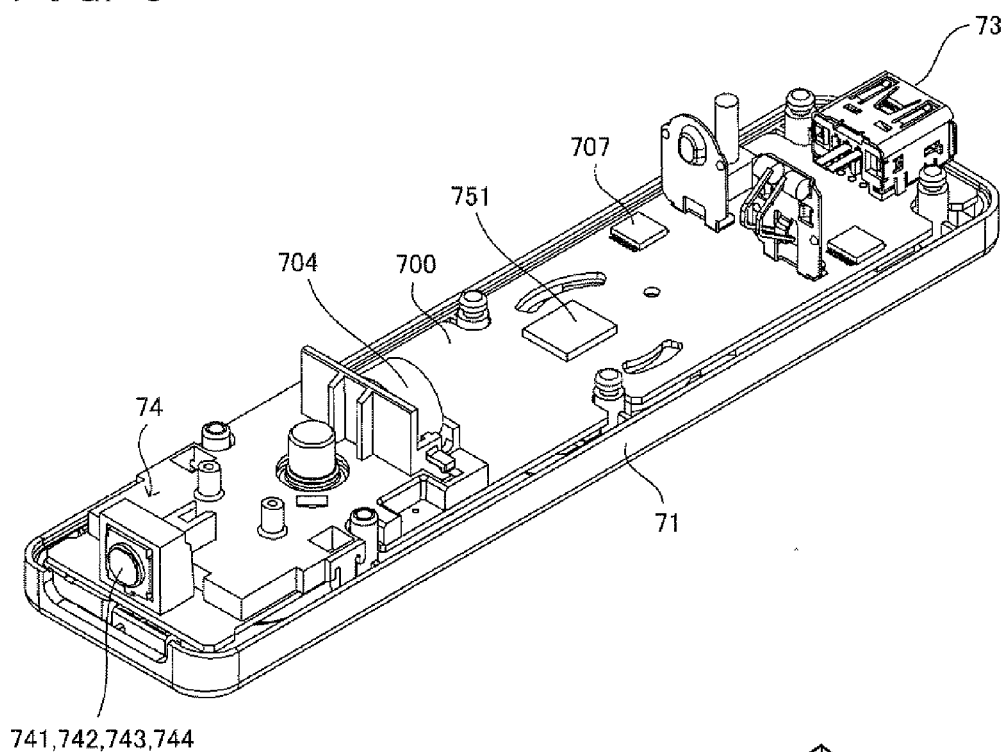
FIG. 6 is a perspective view of the controller 7 shown in FIG. 4 in a state where a lower housing thereof is removed.

Next, with reference to FIGS. 5 and 6, an internal structure of the controller 7 will be described. FIG. 5 is a perspective view illustrating the controller 7, as viewed from the top rear surface thereof, in a state where an upper casing (a part of the housing 71) thereof is removed. FIG. 6 is a perspective view illustrating the controller 7, as viewed from the front side thereof, in a state where a lower casing (a part of the housing 71) thereof is removed. FIG. 6 shows a perspective view illustrating a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, antenna 754, and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. A quartz oscillator (not shown) is provided inside the housing 71, and generates a reference clock of the microcomputer 751 to be described later. On a top main surface of the substrate 700, the speaker 706 and an amplifier 708 are provided. Further, the acceleration sensor 701 is provided on the substrate 700 to the left of the operation button 72d (that is, not at the center portion of the substrate 700 but near the periphery of the substrate 700). Accordingly, in addition to a directional change of gravity acceleration, the acceleration sensor 701 is capable of detecting acceleration including an acceleration component exerted by a centrifugal force in accordance with the controller 7 rotating about the longer direction thereof. Therefore, the game apparatus body 5 or the like is capable of determining, through a predetermined calculation, a motion of the controller 7 sufficiently accurately in accordance with the detected acceleration data.

As shown in FIG. 6, at a front edge of a bottom main surface of the substrate 700, the imaging information calculation section 74 is provided. The imaging information calculation section 74 includes an infrared filer 741, a lens 742, the image pickup element 743, and an image processing circuit 744, located in this order from the front surface of the controller 7 on the bottom surface of the substrate 700. To a rear edge of the bottom main surface of the substrate 700, the connector 73 is attached. Further, on the bottom main surface of the substrate 700, a sound IC 707 and the microcomputer 751 are provided. The sound IC 707, which is connected to the microcomputer 751 and the amplifier 708 via the line formed on the substrate 700 and the like, outputs an audio signal to the speaker 706 via the amplifier 708 in accordance with the sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via the line formed on the substrate 700 and the like, and is powered on/off in accordance with vibration data transmitted from the game apparatus body 5. The controller 7 is vibrated by an actuation of the vibrator 704, and the vibration is conveyed to the player's hand holding the controller 7. Thus, a so-called vibration-responsive game may be realized. The vibrator 704 is provided near the front part of the housing 71, and therefore, a large vibration of the housing 71 allows the player holding the controller 7 to easily feel the vibration.

[Internal Configuration of Unit-Equipped Controller 6]

Next, with reference to FIG. 7, an internal configuration of the unit-equipped controller 6 (controller 7 having the angular velocity detection unit 9) will be described. FIG. 7 is a block diagram illustrating an exemplary configuration of the unit-equipped controller 6.

As shown in FIG. 7, the controller 7 includes the communication section 75, in addition to the operation section 72, the imaging information calculation section 74, the acceleration sensor 701, the vibrator 704, the speaker 706, the sound IC 707, and the amplifier 708 as described above.

The imaging information calculation section 74 includes the infrared filer 741, the lens 742, the image pickup element 743, and the image processing circuit 744. The infrared filer 741 allows only infrared light to pass therethrough, among light incident on the front surface of the controller 7. The lens 742 converges the infrared light having passed through the infrared filer 741 and outputs the infrared light to the image pickup element 743. The image pickup element 743 is a solid-state image pickup element such as a CMOS sensor or a CCD. The image pickup element 743 takes an image of the infrared light converged by the lens 742. Therefore, the image pickup element 743 takes an image of only the infrared light having passed through the infrared filer 741, and generates image data. The image data generated by the image pickup element 743 is processed by the image processing circuit 744. Specifically, the image processing circuit 744 processes the image data obtained from image pickup element 743, detects a high brightness area, and outputs process result data to the communication section 75, the process result data being indicative of a coordinate point and a size of the detected area. The imaging information calculation section 74 is fixed to the housing 71 of the controller 7, and thus an imaging direction thereof can be changed by changing the direction of the housing 71.

The controller 7 preferably includes a three-axis (X-axis, Y-axis, Z-axis) the acceleration sensor 701. The three-axis the acceleration sensor 701 detects a linear acceleration in three directions, i.e., the up-down direction (Y-axis shown in FIG. 3), the left-right direction (X-axis shown in FIG. 3), and the front-rear direction (Z-axis shown in FIG. 3). Further, an accelerometer capable of detecting linear acceleration in at least one axis direction (e.g., X-axis and Y-axis) may be used, alternatively. For example, the acceleration sensor 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of accelerometer (for example, piezoelectric type or piezoresistance type) now existing or to be developed later may be used to provide the acceleration sensor 701.

An accelerometer used in the acceleration sensor 701 is capable of detecting acceleration (linear acceleration) only along a straight line corresponding to each axis of the acceleration sensor 701. In other words, directly output from the acceleration sensor 701 is a signal indicative of the linear acceleration (static or dynamic) along each of the three axes. As a result, the acceleration sensor 701 cannot directly detect movement along non-linear (e.g., arcute) path, rotation, rotational movement, angular displacement, tilt, position, orientation, or any other physical characteristic.

However, when a computer, such as a processor (e.g., the CPU 10) of the game apparatus or a processor (e.g., the microcomputer 751) of the controller, processes acceleration signal outputted from the acceleration sensor 701, additional information relating to the controller 7 can be inferred or calculated (determined), as one skilled in the art will readily understand from the description herein.

For example, suppose a case where the computer processes the acceleration signal outputted from the acceleration sensor 701 of the controller 7 in a static state (that is, a case where it is anticipated that acceleration detected by the acceleration sensor 701 includes gravity acceleration only). In the case where the controller 7 is actually in a static state, it is possible to determine whether or not the controller 7 tilts relative to the direction of gravity and also to determine a degree of the tilt, based on the detected acceleration. Specifically, when a detected axis of the acceleration sensor 701 is directed to a vertically-downward direction, and such a situation is set as a reference, then it is possible to determine whether or not the controller 7 tilts relative to the vertically-downward direction, based on only whether or not 1G (gravity acceleration) is applied in the detected axis direction. Further, based on the magnitude of the acceleration applied in the detected axis direction, it is possible to determine a degree of the tilt of the controller 7 relative to the vertically-downward direction. Further, in the case of the acceleration sensor 701 which is capable of detecting the acceleration in multi-axis directions, an acceleration signal detected along each of the axes is processed, whereby it is possible to determine the tilt of the controller 7 relative to the direction of gravity. In this case, in accordance with an output from the acceleration sensor 701, data indicative of a tilt angle of the controller 7 may be calculated by the processor. Alternatively, without calculating the data indicative of the tilt angle, an approximate degree of the tilt of the controller 7 may be inferred based on the output from the acceleration sensor 701. In this manner, it is possible to determine the tilt, the orientation, or the position of the controller 7 by using the acceleration sensor 701 and the processor in a combined manner.

On the other hand, in the case where the acceleration sensor 701 is in a dynamic state, the acceleration sensor 701 detects acceleration based on a movement of the acceleration sensor 701 in addition to the gravity acceleration component. Therefore, when the gravity acceleration component is eliminated through a predetermined process, it is possible to determine, for example, a direction in which the controller 7 moves. Specifically, when the controller 7 including the acceleration sensor 701 is dynamically accelerated and moved by a hand of a player, it is possible to calculate various motions and/or positions of the controller 7 by processing the acceleration signals generated by the acceleration sensor 701. Even in the case where the acceleration sensor 701 is in a dynamic state, it is possible to determine the tilt of the controller 7 relative to the direction of gravity provided that the acceleration based on the movement of the acceleration sensor 701 is eliminated through the predetermined process.

In another embodiment, the acceleration sensor 701 may include an embedded signal processor or another type of dedicated processor for performing any desired process on the acceleration signal which is outputted from an embedded accelerometer before the signal is outputted to the microcomputer 751. For example, when the acceleration sensor 701 is designed to detect static acceleration (for example, the gravity acceleration), the embedded signal processor or the dedicated processor may convert the detected acceleration signal into a corresponding tilt angle (or another preferable parameter). Data indicative of the acceleration detected by the acceleration sensor 701 is outputted to the communication section 75.

The communication section 75 includes the microcomputer 751, a memory 752, the wireless module 753, and the antenna 754. At the time of processing, the microcomputer 751 controls the wireless module 753 for wirelessly transmitting transmission data while using the memory 752 as a storage area. Further, the microcomputer 751 controls operations of the sound IC 707 and the vibrator 704 in accordance with the data received by the wireless module 753 from the game apparatus body 5 via the antenna 754. The sound IC 707 processes the sound data and the like transmitted from the game apparatus body 5 via the communication section 75. Further, the microcomputer 751 actuates the vibrator 704 in accordance with vibration data (e.g., a signal for turning the vibrator 704 "ON" or "OFF") transmitted from the game apparatus body 5 via the communication section 75. Further, the microcomputer 751 is connected to the connector 73. Data transmitted from the angular velocity detection unit 9 is inputted to the microcomputer 751 via the connector 73. Hereinafter, a configuration of the angular velocity detection unit 9 will be described.

The angular velocity detection unit 9 includes the plug 93, the microcomputer 94, the two-axis gyro sensor 95, and the one-axis gyro sensor 96. As described above, the angular velocity detection unit 9 detects angular velocities around three axes (the X-axis Y-axis, and Z-axis in the present embodiment), and outputs data (angular velocities) indicative of the detected angular velocities to the controller 7.

The two-axis gyro sensor 95 detects angular velocities (per unit time) around the Y-axis and around the X-axis, respectively. Further, the one-axis gyro sensor 96 detects angular velocity (per unit time) around the Z-axis.

In the present embodiment, in order to detect the angular velocities around the three axes, the two-axis gyro sensor 95 and the one-axis gyro sensor 96 are used, however, in another embodiment, the number and the combination of the gyro sensors may be determined arbitrarily as long as the angular velocities around the three axes can be detected. The two-axis gyro sensor 95 and the one-axis gyro sensor 96 will be collectively described as the gyro sensors 95 and 96.

Data indicative of the angular velocities detected by the gyro sensors 95 and 96 is outputted to the microcomputer 94. Therefore, data indicative of the angular velocities around three of the X-axis, Y-axis, and Z-axis is inputted to the microcomputer 94. The microcomputer 94 outputs, as angular velocity data, data indicative of the angular velocities around the above-described three axes to the controller 7 via the plug 93. The output from the microcomputer 94 to the controller 7 is performed sequentially in predetermined cycles. Since the game process is generally performed in a cycle of 1/60 sec. (as one frame time), the wireless transmission is preferably performed in a cycle of a shorter time period.

The controller 7 will be described again. Data from the controller 7 such as an operation signal (key data) from the operation section 72, an acceleration signal in the three axis directions (X-axis, Y-axis, and Z-axis direction acceleration data) from the acceleration sensor 701, process result data from the imaging information calculation section 74, and data indicative of the angular velocities around the three axes (X-axis, Y-axis, and Z-axis angular velocity data) from the angular velocity detection unit 9 are outputted to the microcomputer 751. The microcomputer 751 temporarily stores the inputted data (the key data, the X-axis, Y-axis, and Z-axis direction acceleration data, the process result data, and the X-axis, Y-axis, and Z-axis angular velocity data) in the memory 752 as transmission data to be transmitted to the wireless controller module 19. The wireless transmission from the communication section 75 to the wireless controller module 19 is performed in predetermined time cycles. Since the game process is generally performed in a cycle of 1/60 sec., the wireless transmission needs to be performed in a cycle of a shorter time period. Specifically, the game process is performed in a cycle of 16.7 ms (1/60 sec.), and a transmission cycle of the communication section 75 composed of the Bluetooth (registered trademark) is 5 ms. At a timing of performing a wireless transmission to the wireless controller module 19, the microcomputer 751 outputs, to the wireless module 753, the transmission data stored in the memory 752 as a series of pieces of operation information. The wireless module 753 then uses the Bluetooth (registered trademark) technology, for example, so as to emit a radio signal indicative of the operation information from the antenna 754 by using a carrier wave having a predetermined frequency. In other words, data including the key data from the operation section 72, the X-axis, Y-axis and Z-axis direction acceleration data from the acceleration sensor 701, the process result data from the imaging information calculation section 74, and the X-axis, Y-axis, and Z-axis angular velocity data received from the angular velocity detection unit 9 is transmitted from the controller 7. The wireless controller module 19 of the game apparatus body 5 receives the radio signal, and the radio signal is demodulated or decoded in the game apparatus body 5, whereby a series of pieces of operation information (such as the key data, the X-axis, Y-axis, and Z-axis direction acceleration data, the process result data, and the X-axis, Y-axis, and Z-axis angular velocity data) is obtained. The CPU 10 included in the game apparatus body 5 performs the game process based on the obtained operation information and on the game program. In the case where the communication section 75 is configured by using the Bluetooth (registered trademark) technology, the communication section 75 may have a function of receiving transmission data wirelessly transmitted from another device.

By using the unit-equipped controller 6, the player can perform not only a general game operation of pressing respective operation buttons, which is conventionally introduced, but can also perform an operation of tilting the unit-equipped controller 6 at an arbitrary tilt angle. In addition, by using the unit-equipped controller 6, the player can perform an operation of pointing the unit-equipped controller 6 to a given position on a screen, and can perform an operation of moving the unit-equipped controller 6.

Characteristic Operation of the Present Embodiment

In the following, a characteristic operation performed by the game apparatus body 5 will be described. The characteristic operation is, in the present embodiment, an operation of moving an item (object) within an area displayed on a screen, by scrolling (or switching) the area, to another area currently not displayed on the screen.

FIG. 8 illustrates an operation of moving a pointer 101 displayed on a screen 100 of the monitor 2 by using the unit-equipped controller 6. As shown in FIG. 8, the pointer 101 represents a right hand. As shown in FIG. 8, a player can move the pointer 101 by performing a waving operation such that an orientation of the unit-equipped controller 6 changes. Specifically, when the player waves the unit-equipped controller 6 in a rotation direction (counterclockwise rotation direction with respect to a Y-axis positive direction) indicated by an arrow 102, the pointer 101 moves in a right direction (direction of an arrow 106). When the player waves the unit-equipped controller 6 in a rotation direction (clockwise rotation direction with respect to the Y-axis positive direction) indicated by an arrow 103, the pointer 101 moves in a left direction (direction of an arrow 107). When the player waves the unit-equipped controller 6 in a rotation direction (counterclockwise rotation direction with respect to an X-axis positive direction) indicated by an arrow 104, the pointer 101 moves in a down direction (direction of an arrow 108). When the player waves the unit-equipped controller 6 in a rotation direction (clockwise rotation direction with respect to the X-axis positive direction) indicated by an arrow 105, the pointer 101 moves in an up direction (direction of an arrow 109). It should be noted that the operation can be realized by moving the pointer 101 a distance based on angular velocities around the X-axis, the Y-axis, and the Z-axis detected by the angular velocity detection unit 9.

Further, as shown in FIG. 8, in an area within a virtual space displayed on the screen 100, there are a plurality of quadrangular positioning areas 200 in which items (objects) are positioned. There are various types of positioning areas 200. In the present embodiment, there are a normal type positioning area 200a, a bug cage type positioning area 200b representing a bug cage, and a sword pedestal type positioning area 200e which is larger than the normal type. In addition, among items positioned on the positioning areas 200, there are a clothes item 300a representing a clothes, a jewelry item 300b representing a jewelry, a bug item 300c representing a bug, a sword item 300d representing a sword, and the like. The clothes item 300a and the jewelry item 300b and the like are the normal items and are positioned on the normal type positioning areas 200a. The bug item 300c and the sword item 300d are special items and the bug item 300e is positioned on the bug cage type positioning area 200b and the sword item 300d is positioned on the sword pedestal type positioning area 200c.

Figure 9:
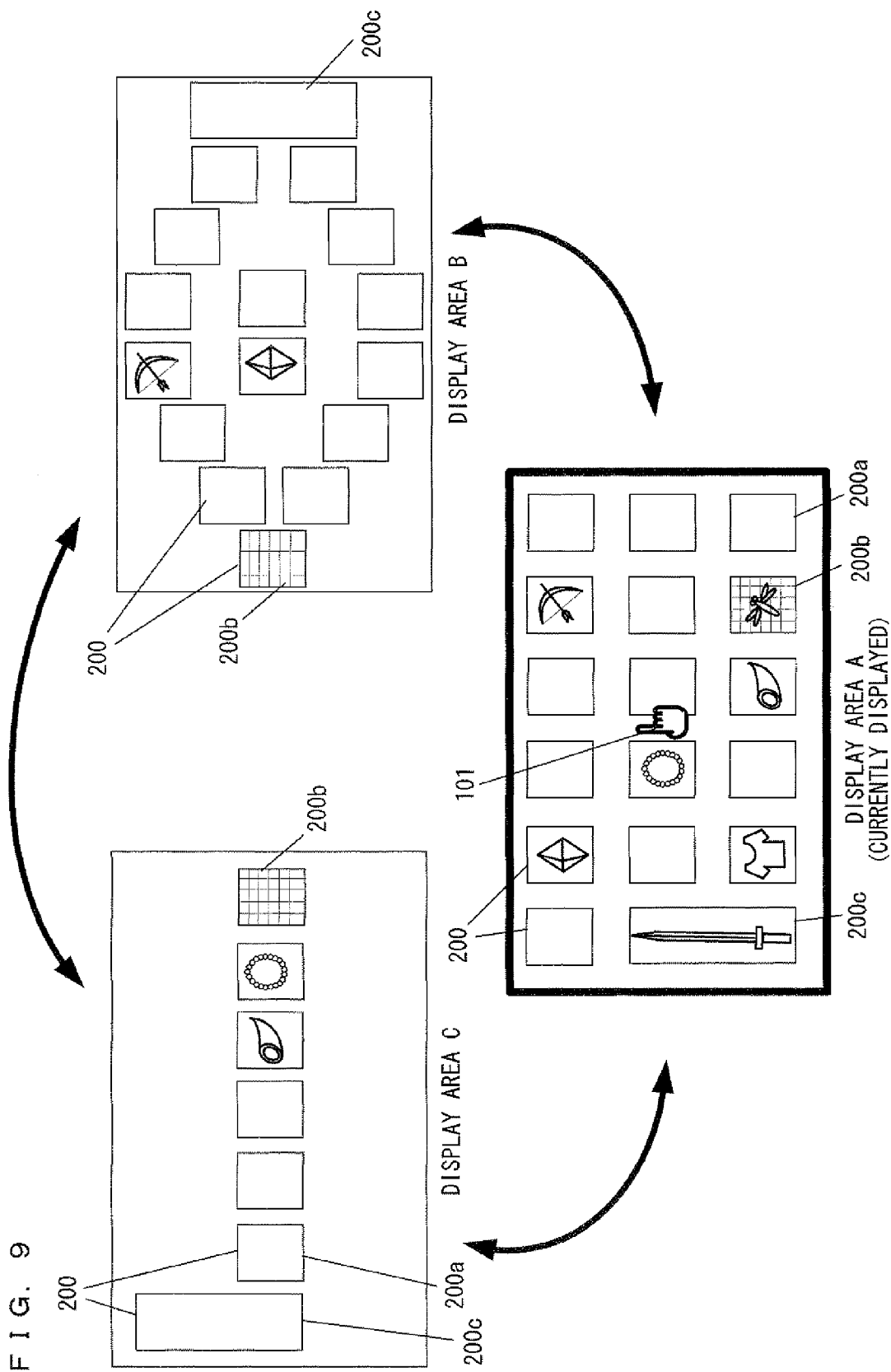
FIG. 9 illustrates respective areas within a virtual space displayed on the screen 100.

FIG. 9 illustrates respective areas within the virtual space displayed on the screen 100. As shown in FIG. 9, on the screen 100, one of a plurality of areas (hereinafter referred to as "display areas") A to C within the virtual space is displayed. The display area A is a display area displayed on the screen 100 of FIG. 8. In the following, a currently displayed display area on the screen 100 is indicated by a thick frame. In the display areas B and C, as in the same manner as in the display area A, the positioning areas 200 are positioned and items are also positioned. Further, as shown in FIG. 9, the positioning areas 200 in each of the display areas A to C are different in number and position from each other.

As will be described in the following, by using the unit-equipped controller 6, the player can determine a desired item displayed on the screen 100 as an item (target item to be moved) to be moved, and, as indicated by arrows of FIG. 9, move the target item to be moved to another display area by switching the display area. It should be noted that, in the following description, a thick frame indicating that the area is being displayed on the screen 100 is fixed on the screen, and the display area to be displayed on the screen 100 is switched by moving the display areas A to C.

Firstly, with reference to FIGS. 10 to 17B, an action (operation) of moving the clothes item 300a which is a normal item positioned in the normal type positioning area 200a in the display area A to another display area will be described in detail.

Figure 10:
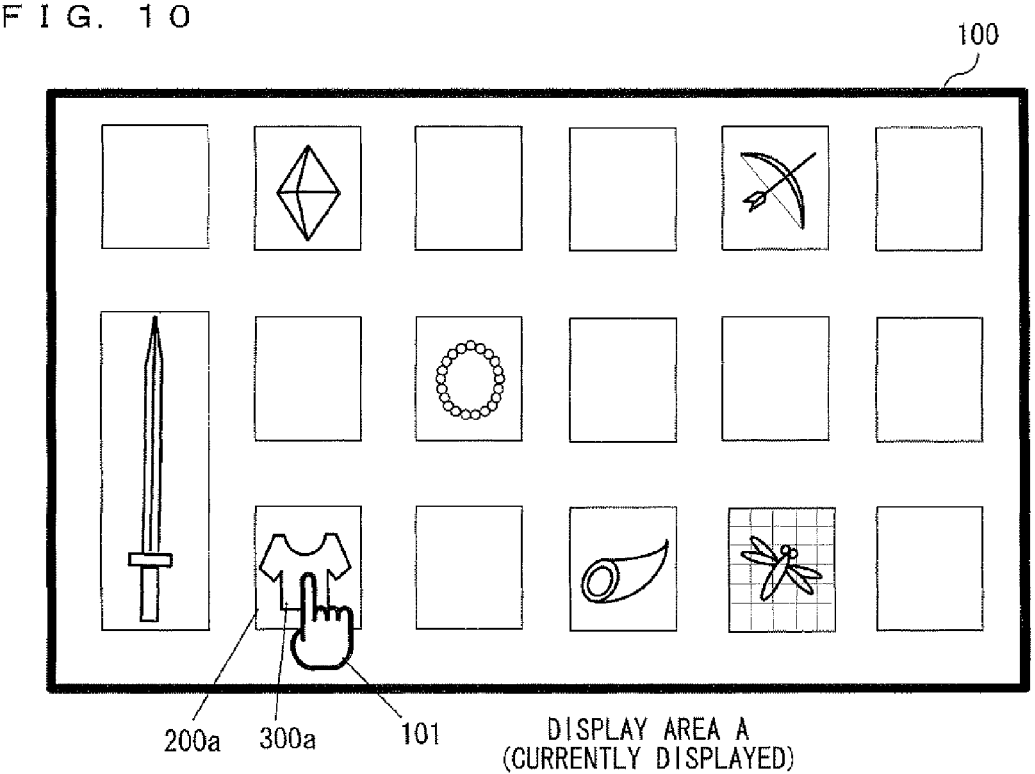
FIG. 10 illustrates an action (operation) of moving a clothes item 300*a* which is a normal item positioned in the normal type positioning area 200*a* in a display area A to another display area.
Figure 11:
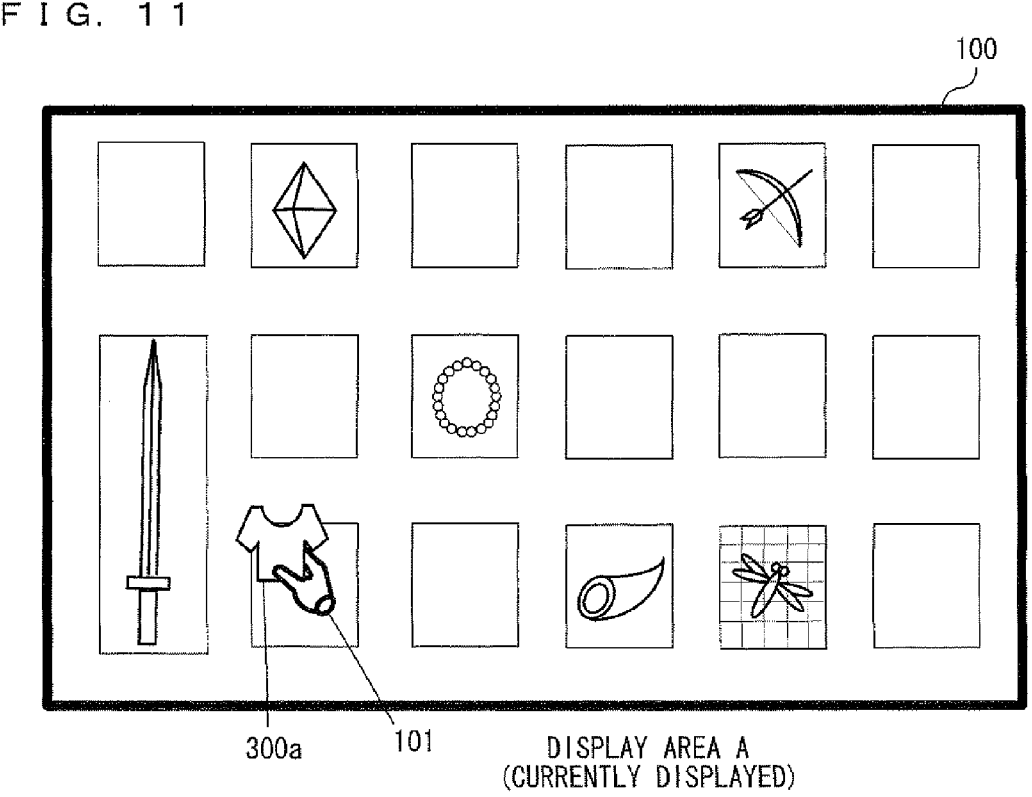
FIG. 11 illustrates an action (operation) of moving the clothes item 300*a* which is a normal item positioned in the normal type positioning area 200*a* in the display area A to another display area.

As shown in FIG. 10, by performing an operation of waving the unit-equipped controller 6 as described with reference to FIG. 8, the player moves the pointer 101 to a position of the clothes item 300a. Then, as shown in FIG. 11, by pressing the A button (72d: see FIG. 3) of the unit-equipped controller 6, the player determines the clothes item 300a as a target item to be moved. FIG. 11 illustrates a display in which the right hand-shaped pointer 101 lifts up the clothes item 300a, thereby determining the clothes item 300a as a target item to be moved.

Figure 12:
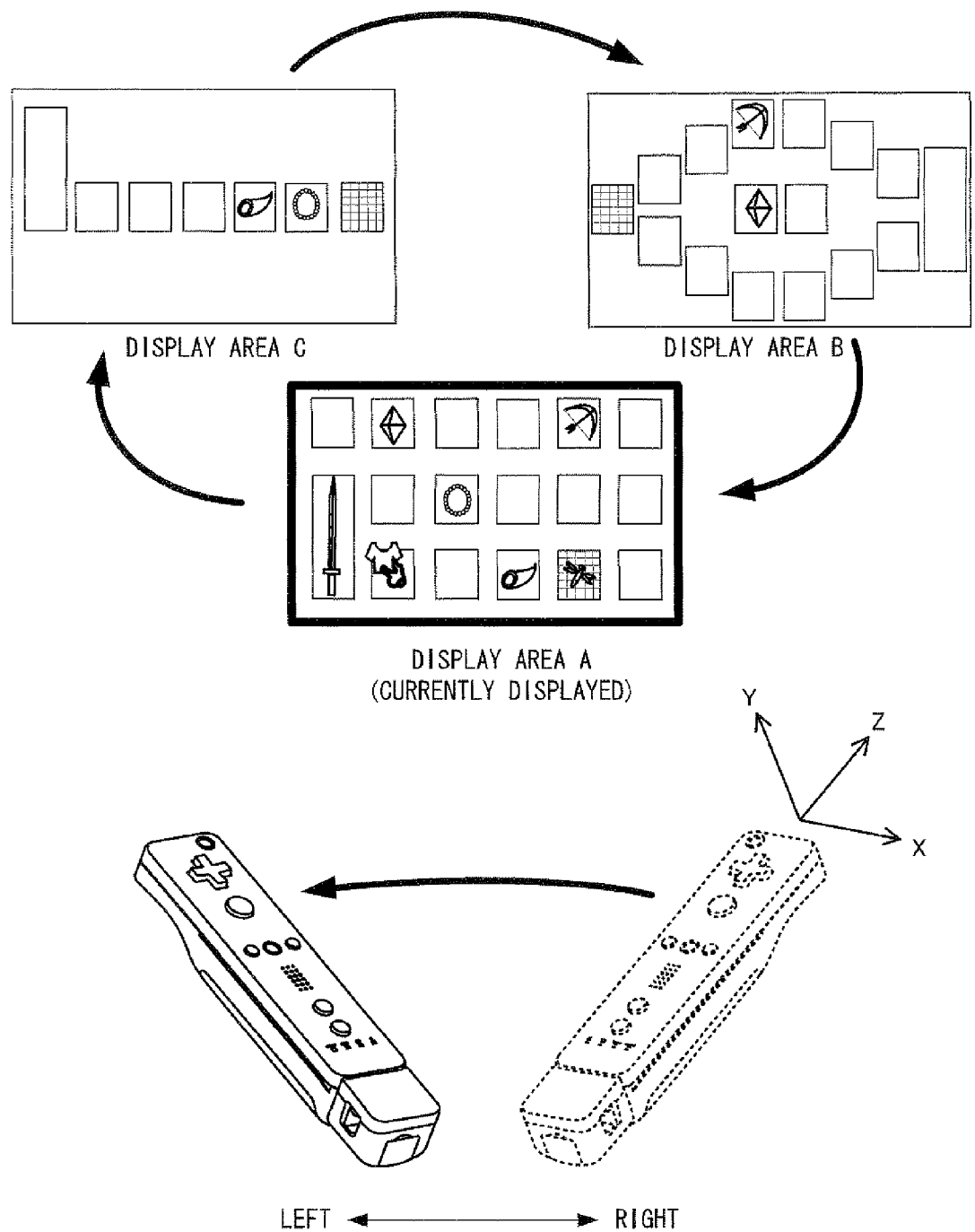
FIG. 12 illustrates an action (operation) of moving the clothes item 300*a* which is a normal item positioned in the normal type positioning area 200*a* in the display area A to another display area.

Thereafter, when the player intends to move the clothes item 300a which is determined as a target item to be moved from the display area A to the display area B, as shown in FIG. 12, the player performs an operation of waving the unit-equipped controller 6 in a left direction (X-axis negative direction). In accordance with the operation, the display areas A to C circulate in directions of arrows of FIG. 12, thereby switching the display area displayed on the screen 100 from the display area A to the display area B. As a result, the clothes item 300a moves from the display area A to the display area B.

Figure 13A:
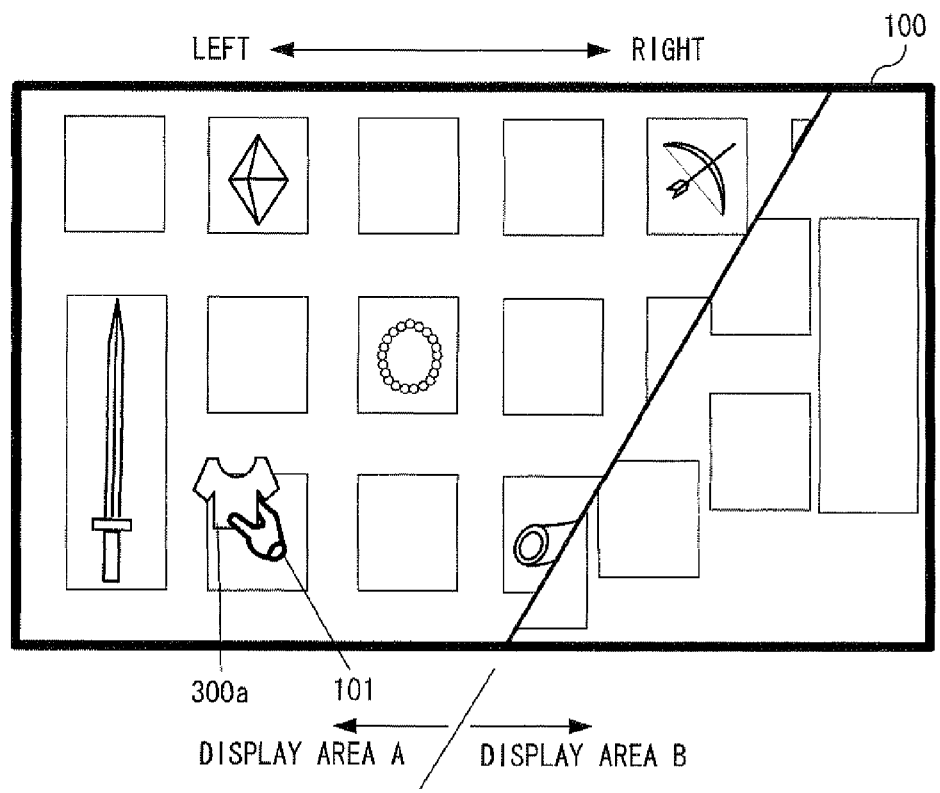
FIG. 13A illustrates an action (operation) of moving the clothes item 300*a* which is a normal item positioned in the normal type positioning area 200*a* in the display area A to another display area.
Figure 13B:
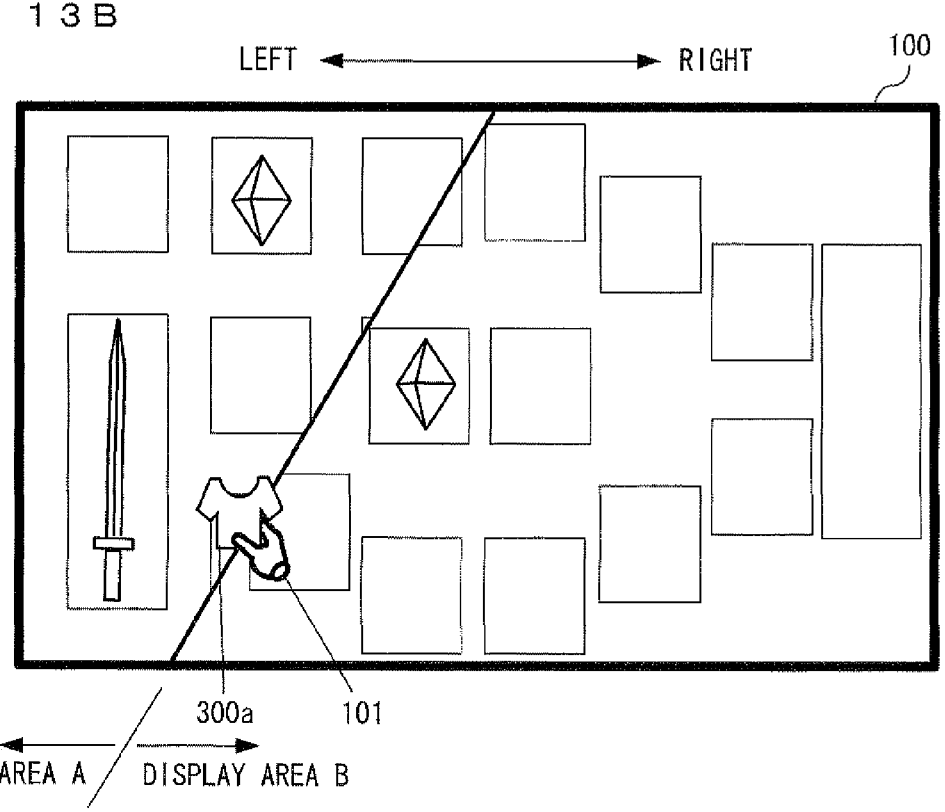
FIG. 13B illustrates an action (operation) of moving the clothes item 300*a* which is a normal item positioned in the normal type positioning area 200*a* in the display area A to another display area.

FIG. 13A and FIG. 13B each illustrate an example of a mode in which the currently displayed display area on the screen 100 is switched from the display area A to the display area B. When, as shown in FIG. 12, an operation of waving the unit-equipped controller 6 in a left direction is performed in a state where the clothes item 300a is determined as a target item to be moved, as shown in FIG. 13A and FIG. 13B, on the screen 100, the display area A is switched gradually from the right side thereof to the display area B At this time, as shown in FIG. 13B, when the display area is switched, the clothes item 300a which is a target item to be moved and the pointer 101 remain in the state of being displayed at the same position of the screen 100.

Figure 14A:
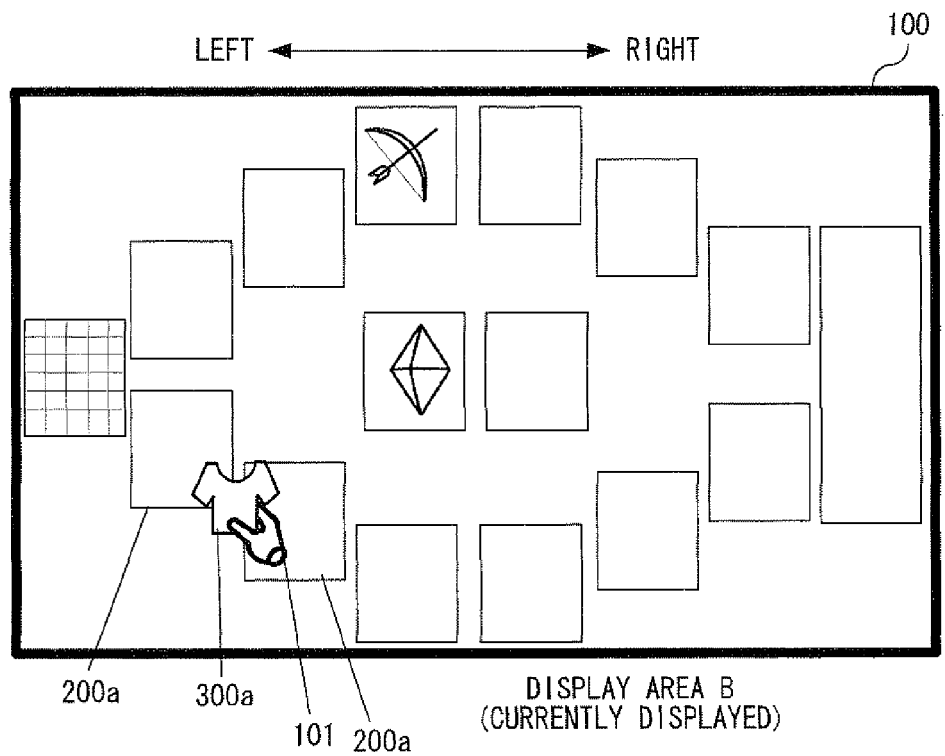
FIG. 14A illustrates an action (operation) of moving the clothes item 300*a* which is a normal item positioned in the normal type positioning area 200*a* in the display area A to another display area.
Figure 14B:
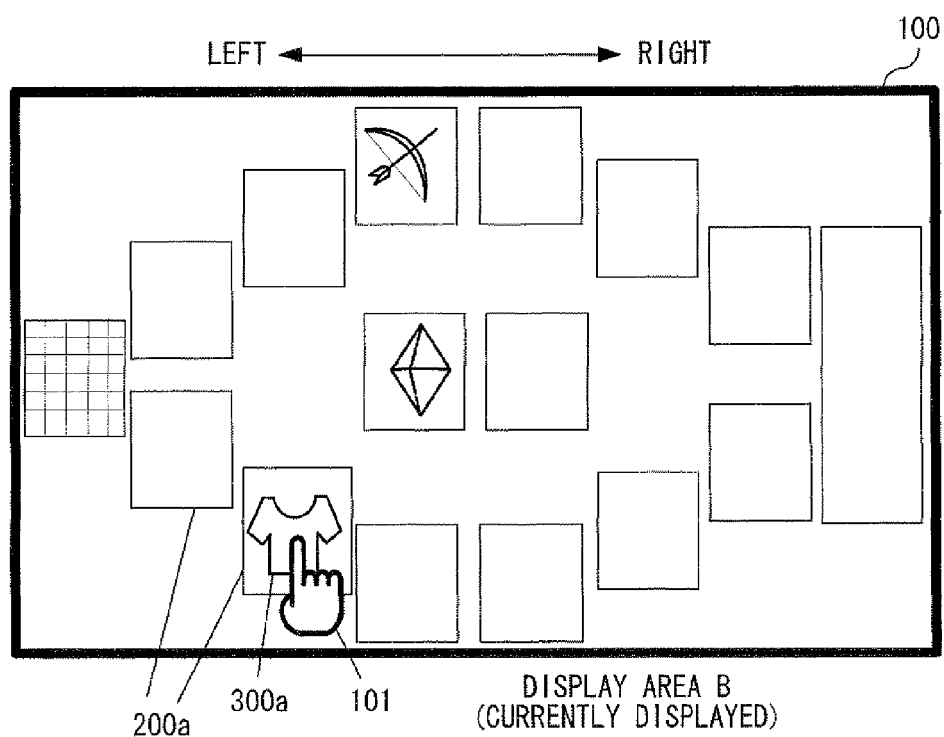
FIG. 14B illustrates an action (operation) of moving the clothes item 300*a* which is a normal item positioned in the normal type positioning area 200*a* in the display area A to another display area.

FIG. 14A shows the screen 100 on which the display area A has been switched to the display area B as shown in FIG. 13A and FIG. 13B. In this state, the player is pressing the A button of the unit-equipped controller 6 and the clothes item 300a remains determined as a target item to be moved. Then, when the A button is released from being pressed by the player, as shown in FIG. 14B, the clothes item 300a and the pointer 101 are moved to above the normal type positioning area 200a in the display area B after the movement, which is associated in advance with the normal type positioning area 200a (see FIG. 10) in the display area A in which the clothes item 300a has been positioned before the movement and positioned in the positioning area 200a in the display area B. In FIG. 14B, as an example, the normal type positioning area 200a in a position closest to the clothes item 300a and the pointer 101 is associated with the clothes item 300a and the pointer 101, and the clothes item 300a and the pointer 101 are positioned in the positioning area 200a. It should be noted that, when positioning the item, as shown in FIG. 14B, a display of clothes item 300a being lifted up by the pointer 101 is cancelled and a display of the clothes item 300a placed in the positioning area 200a indicating that the clothes item 300a is no longer a target item to be moved is displayed.

Figure 15:
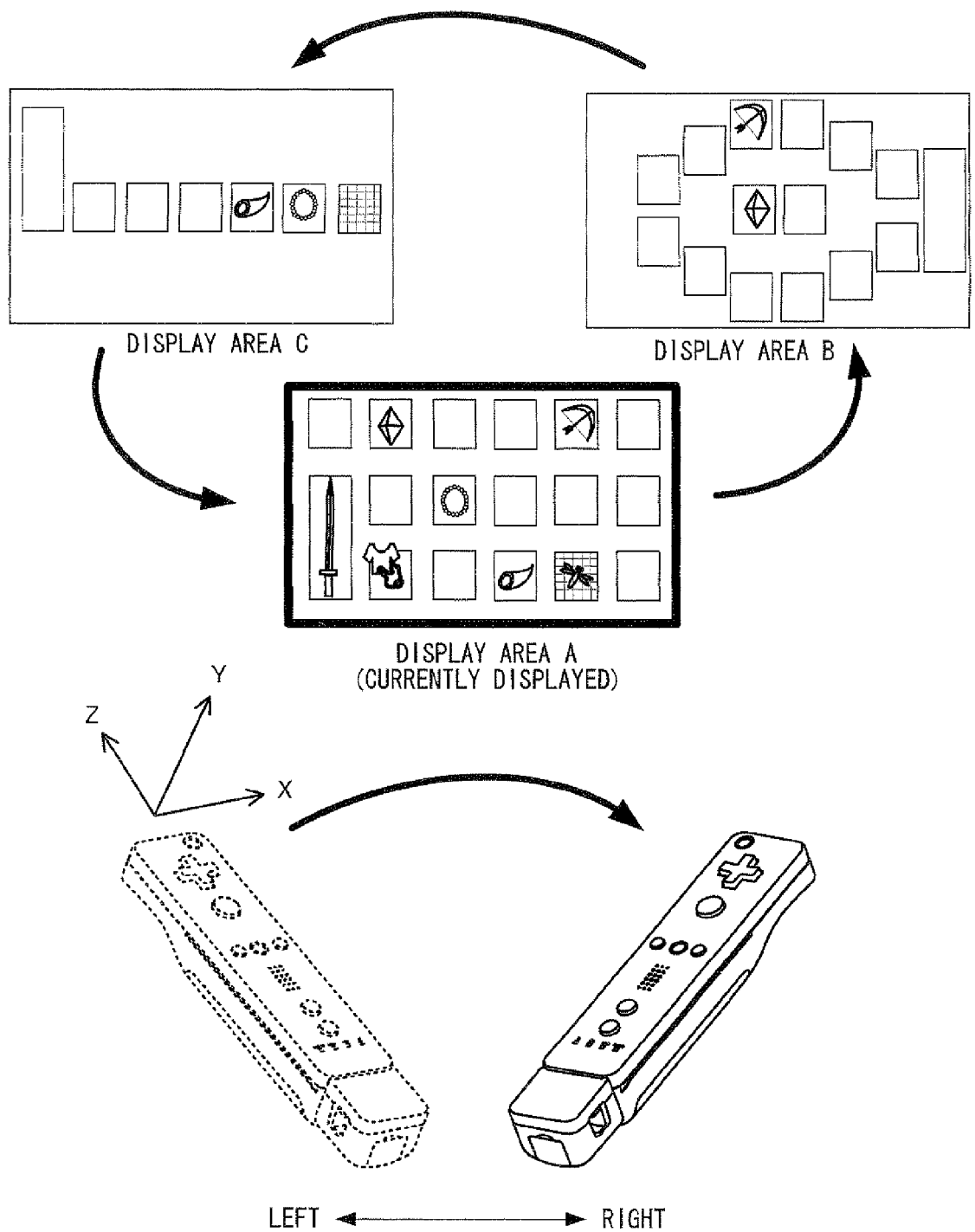
FIG. 15 illustrates an action (operation) of moving the clothes item 300*a* which is a normal item positioned in the normal type positioning area 200*a* in the display area A to another display area.

Next, an action (operation) of moving the clothes item 300a shown in FIG. 11 in the state where the clothes item 300a is determined as a target item to be moved, from the display area A to the display area C. At this time, as shown in FIG. 15, the player performs an operation of waving the unit-equipped controller 6 in a right direction (X-axis positive direction). In accordance with the operation, the display areas A to C circulate in directions of arrows of FIG. 15, and the currently displayed display area on the screen 100 is switched from the display area A to the display area C. As a result, the clothes item 300a is moved from the display area A to the display area C.

Figure 16A:
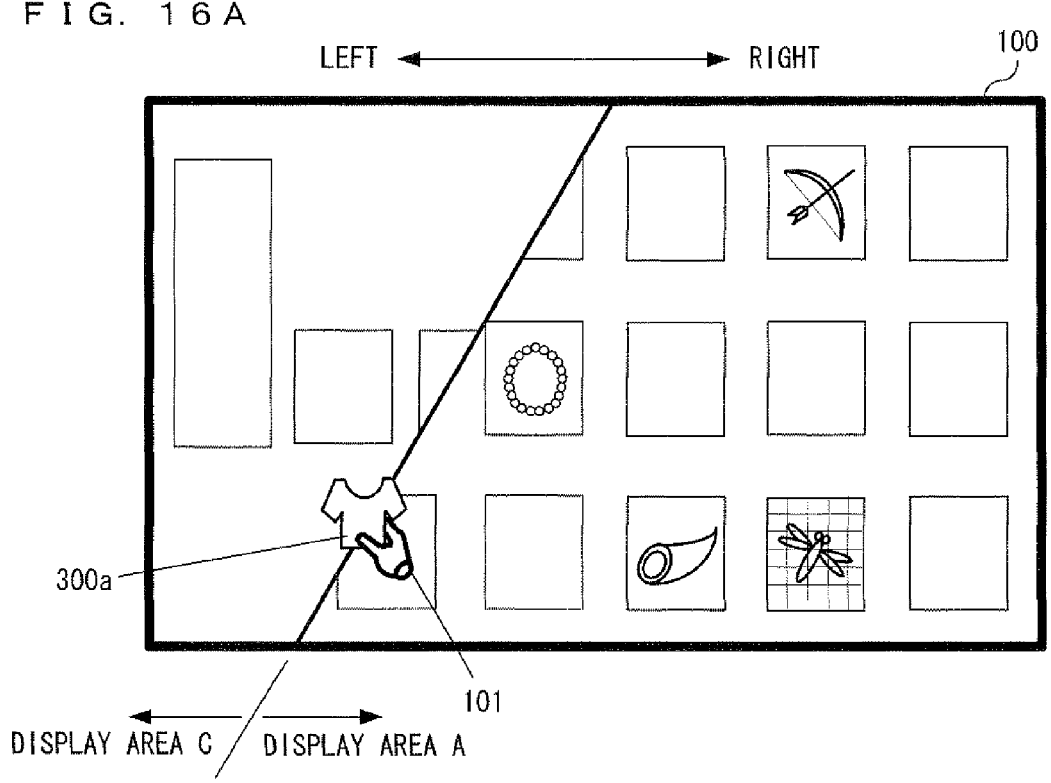
FIG. 16A illustrates an action (operation) of moving the clothes item 300*a* which is a normal item positioned in the normal type positioning area 200*a* in the display area A to another display area.
Figure 16B:
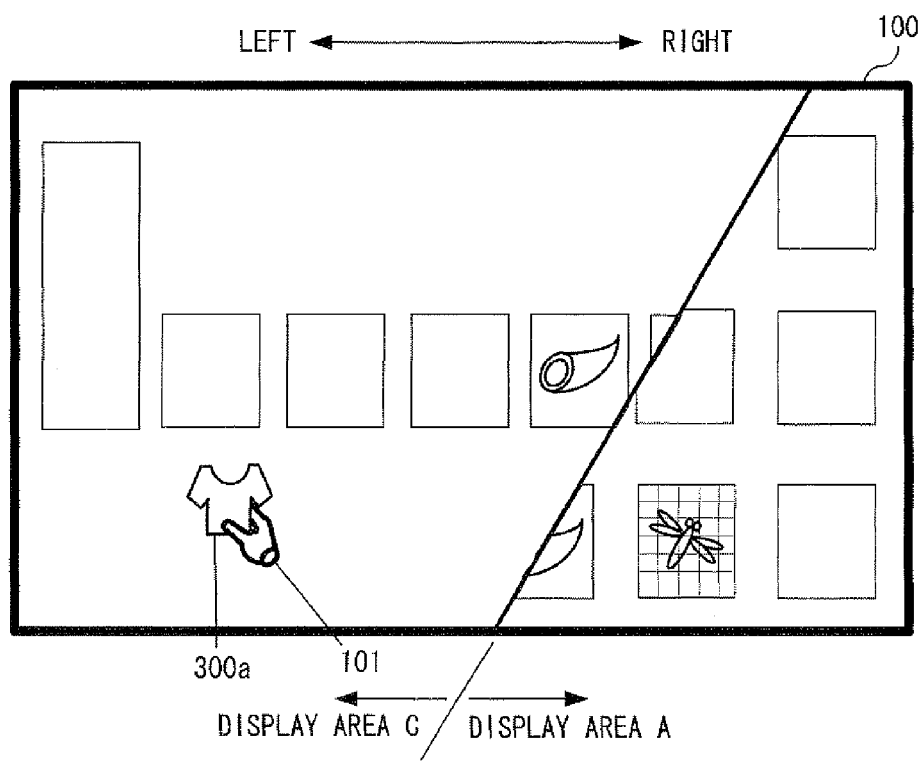
FIG. 16B illustrates an action (operation) of moving the clothes item 300*a* which is a normal item positioned in the normal type positioning area 200*a* in the display area A to another display area.

FIG. 16A and FIG. 16B each illustrate an example of a mode in which the currently displayed display area on the screen 100 is switched from the display area A to the display area C. When, as shown in FIG. 15, an operation of waving the unit-equipped controller 6 in a right direction is performed in a state where the clothes item 300a is determined as a target item to be moved, as shown in FIG. 16A and FIG. 16B, on the screen 100, the display area A is switched gradually from the left side thereof to the display area C At this time, as shown in FIG. 16B, when the display area is switched, the clothes item 300a which is a target item to be moved and the pointer 101 remain in the state of being displayed in the same position of the screen 100.

Figure 17A:
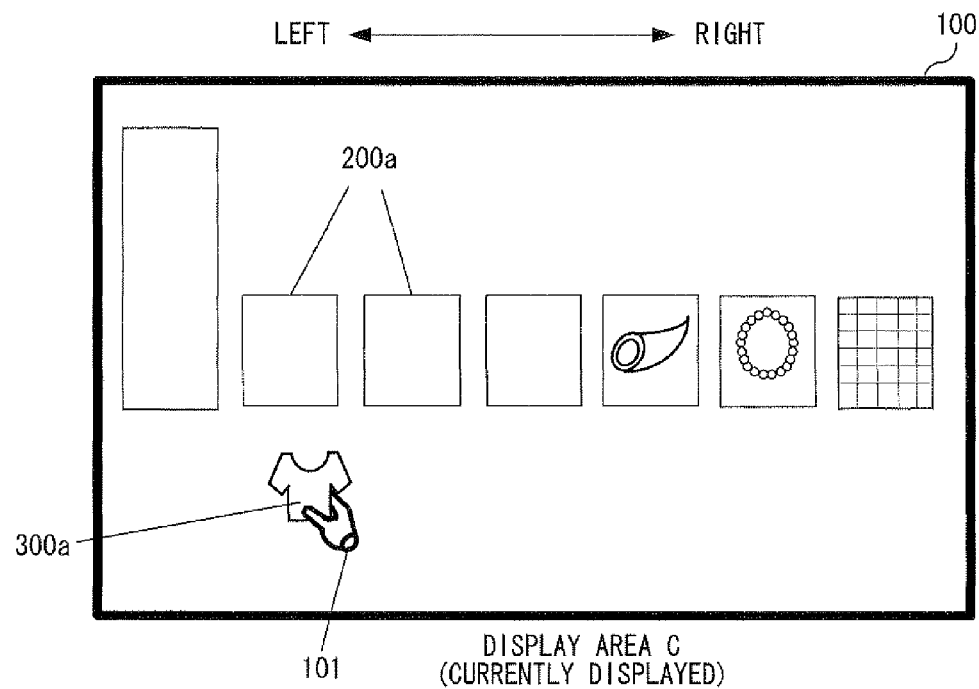
FIG. 17A illustrates an action (operation) of moving the clothes item 300*a* which is a normal item positioned in the normal type positioning area 200*a* in the display area A to another display area.
Figure 17B:
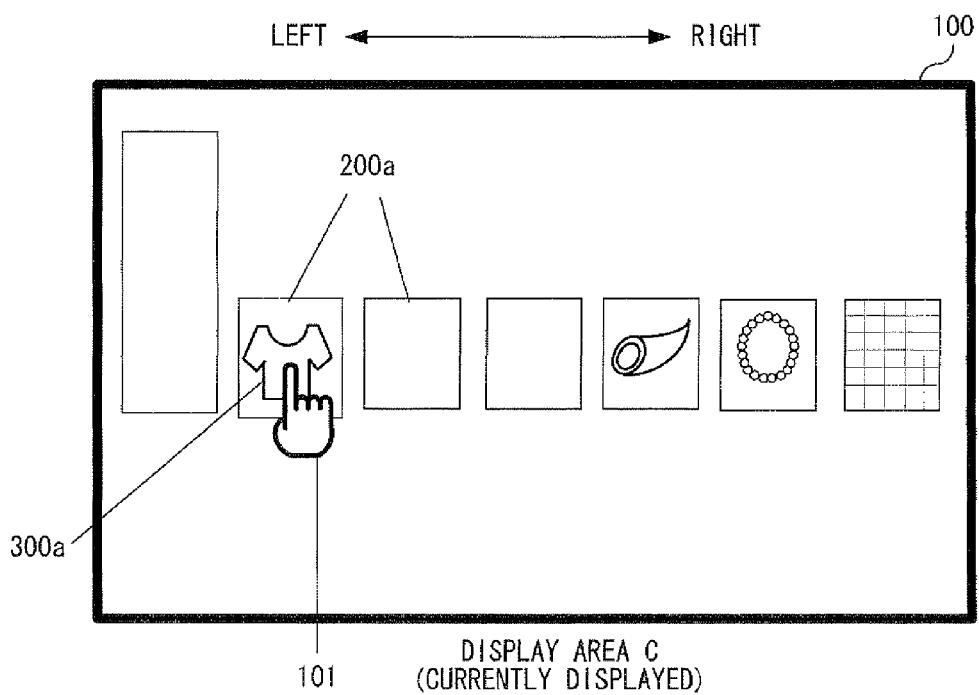
FIG. 17B illustrates an action (operation) of moving the clothes item 300*a* which is a normal item positioned in the normal type positioning area 200*a* in the display area A to another display area.

FIG. 17A shows the screen 100 on which the display area A has been switched to the display area C as shown in FIG. 16A and FIG. 16B. In this state, the player is pressing the A button of the unit-equipped controller 6 and the clothes item 300a remain determined as a target item to be moved. Then, when the A button is released from being pressed by the player, as shown in FIG. 17B, the clothes item 300a and the pointer 101 are moved to above the normal type positioning area 200a in the display area C after the movement, which is associated in advance with the normal type positioning area 200a (see FIG. 10) in the display area A in which the clothes item 300a has been positioned before the movement and positioned in the positioning area 200a in the display area C. In FIG. 17B, as an example, the normal type positioning area 200a in a position closest to the clothes item 300a and the pointer 101 is associated with the clothes item 300a and the pointer 101, and the clothes item 300a and the pointer 101 are positioned in the positioning area 200a. It should be noted that, when positioning the item, as shown in FIG. 17B, a display of clothes item 300a being lifted up by the pointer 101 is cancelled and a display of the clothes item 300a placed in the positioning area 200a indicating that the clothes item 300a is no longer a target item to be moved is displayed.

Next, an action (operation) of determining the sword item 300d (see FIG. 8) which is a special item as a target item to be moved and moving the sword item 300d from the display area A to display area B. It should be noted that an action (operation) of moving the item from the display area A to the display area C will not be described. First, the player performs an operation in the same manner as in the operation described with reference to FIG. 10 and FIG. 11 and determines the sword item 300d as a target item to be moved. Then, the player performs an operation in the same manner as in the operation described with reference to FIG. 12, switches the currently displayed display area on the screen 100 from the display area A to display area B, and moves the sword item 300d from the display area A to display area B.

Figure 18A:
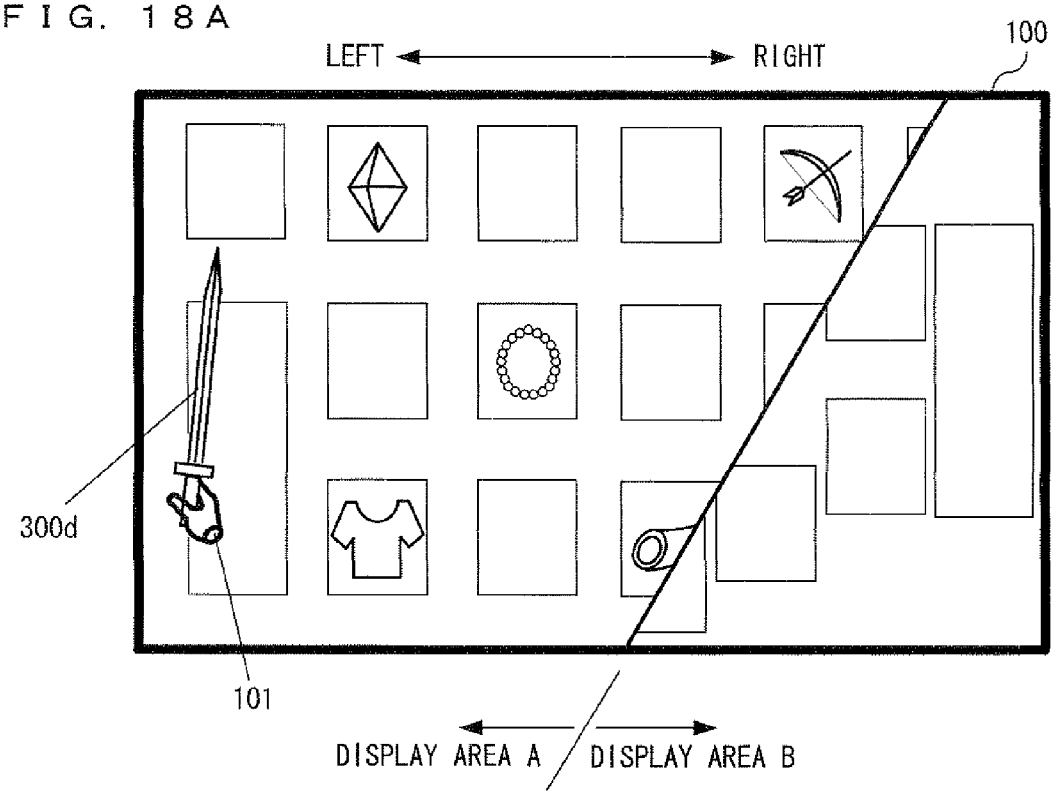
FIG. 18A illustrates an example of a mode in which the currently displayed display area on the screen 100 is switched from the display area A to a display area B.
Figure 18B:
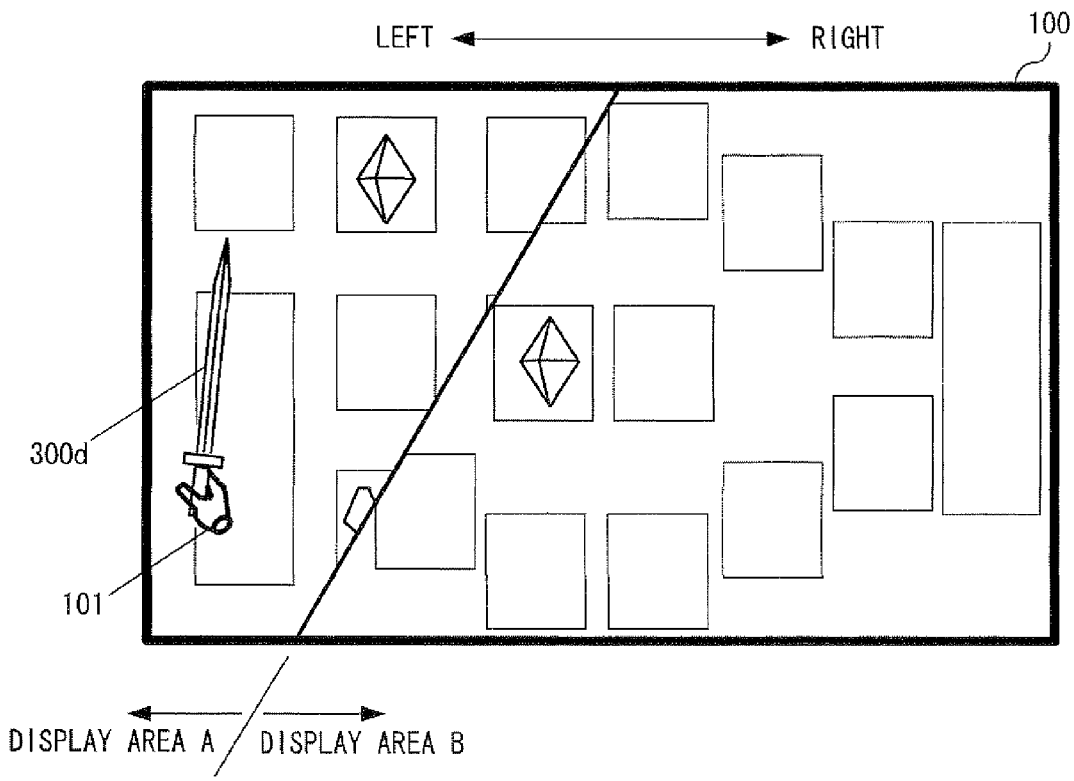
FIG. 18B illustrates an example of a mode in which the currently displayed display area on the screen 100 is switched from the display area A to the display area B.

FIG. 18A and FIG. 18B each illustrate an example of a mode in which the currently displayed display area on the screen 100 is switched from the display area A to the display area B. When an operation of waving the unit-equipped controller 6 in a left direction is performed in a state where the sword item 300d is determined as a target item to be moved, as shown in FIG. 18A and FIG. 18B, on the screen 100, the display area A is switch gradually from the right side thereof to the display area B. At this time, as shown in FIG. 18B, when the display area is switched, the sword item 300d which is a target item to be moved and the pointer 101 remain in the state of being displayed in the same position of the screen 100.

Figure 19A:
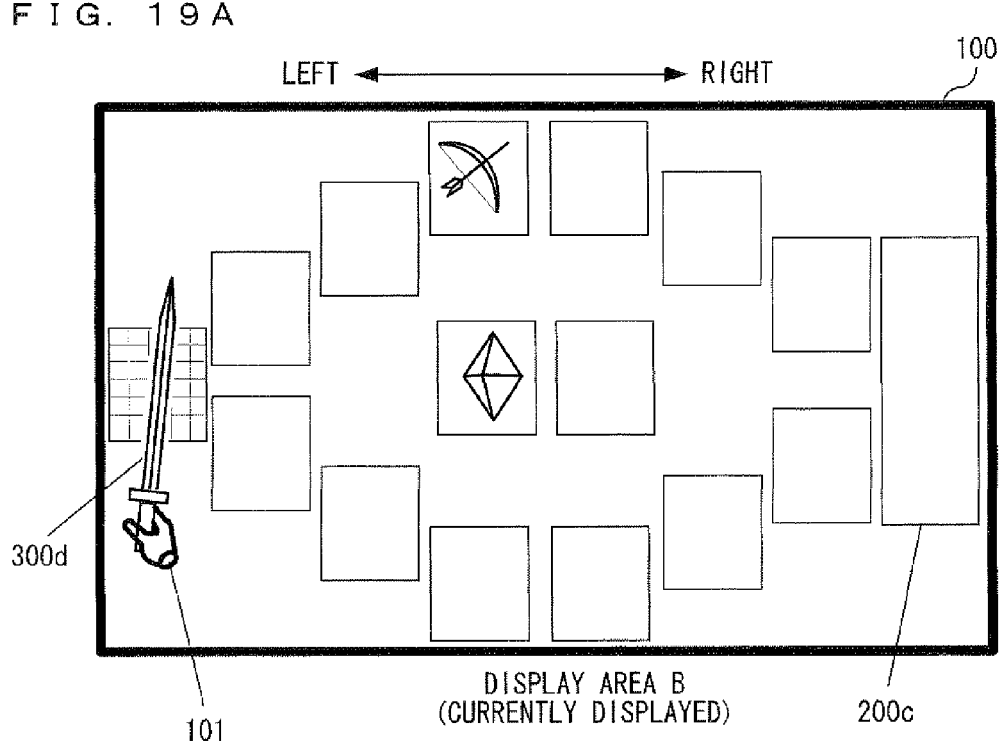
FIG. 19A shows the screen 100 on which the display area A has been switched to the display area B as shown in FIG. 18A and FIG. 18B.
Figure 19B:
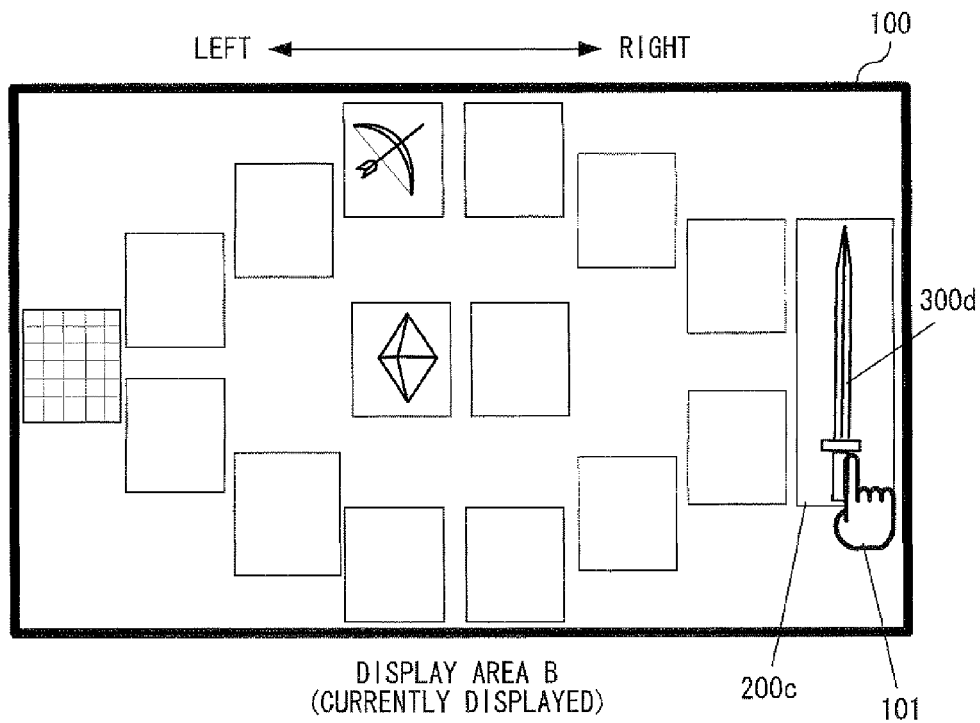
FIG. 19B shows the screen 100 on which the display area A has been switched to the display area B as shown in FIG. 18A and FIG. 18B.

FIG. 19A shows the screen 100 on which the display area A has been switched to the display area B as shown in FIG. 18A and FIG. 18B. In this state, the player is pressing the A button of the unit-equipped controller 6 and the sword item 300d remain determined as a target item to be moved. Then, when the A button is released from being pressed by the player, as shown in FIG. 19B, the sword item 300d and the pointer 101 are moved to above the sword pedestal type positioning area 200c in the display area B after the movement, which is associated in advance with the sword pedestal type positioning area 200c (see FIG. 8) in the display area A in which the sword item 300d has been positioned before the movement and positioned in the positioning area 200c in the display area B. It should be noted that, when positioning the item, as shown in FIG. 19B, a display of the sword item 300d being lifted up by the pointer 101 is cancelled and a display of the sword item 300d placed in the positioning area 200c indicating that the sword item 300d is no longer a target item to be moved is displayed.

Next, an action (operation) of determining the bug item 300c (see FIG. 8) which is a special item as a target item to be moved and moving the bug item 300c from the display area A to the display area B. It should be noted that an action (operation) of moving the item from the display area A to the display area C will not be described. In addition, operations of determining the bug item 300c as a target item to be moved, switching the currently displayed display area on the screen 100 from the display area A to the display area B, and moving the bug item 300c from the display area A to the display area B are similar to those described above, and descriptions thereof are omitted. Further, as shown in FIG. 20A and FIG. 20B, when an operation of waving the unit-equipped controller 6 in a left direction is performed in a state where the bug item 300c is determined as a target item to be moved, in the same manner as those of FIGS. 13A, 13B, 18A and 18B, on the screen 100, the display area A is switched gradually from the right side thereof to the display area B.

Figure 20A:
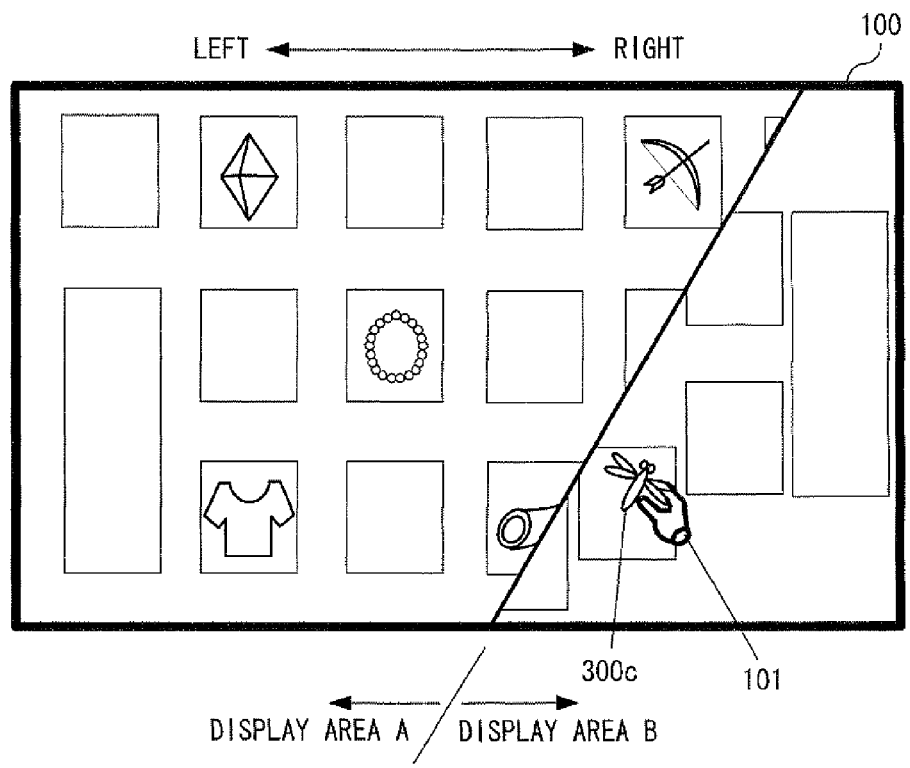
FIG. 20A illustrates an example of a mode in which the currently displayed display area on the screen 100 is switched from the display area A to the display area B.
Figure 20B:
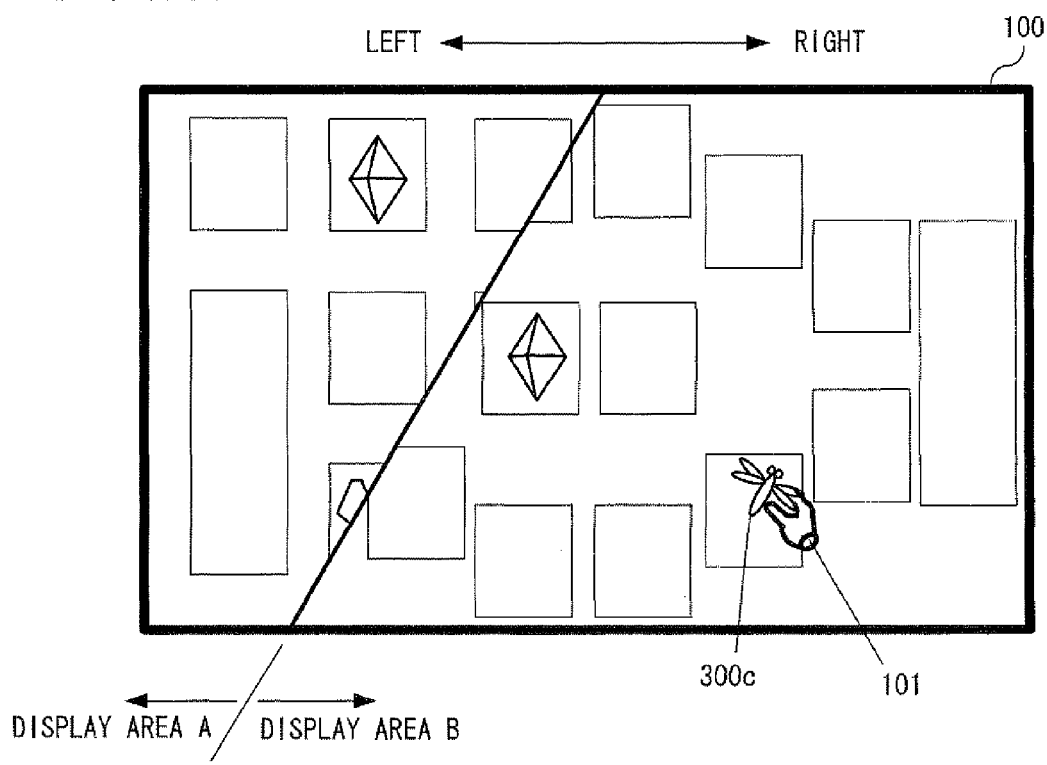
FIG. 20B illustrates an example of a mode in which the currently displayed display area on the screen 100 is switched from the display area A to the display area B.
Figure 21A:
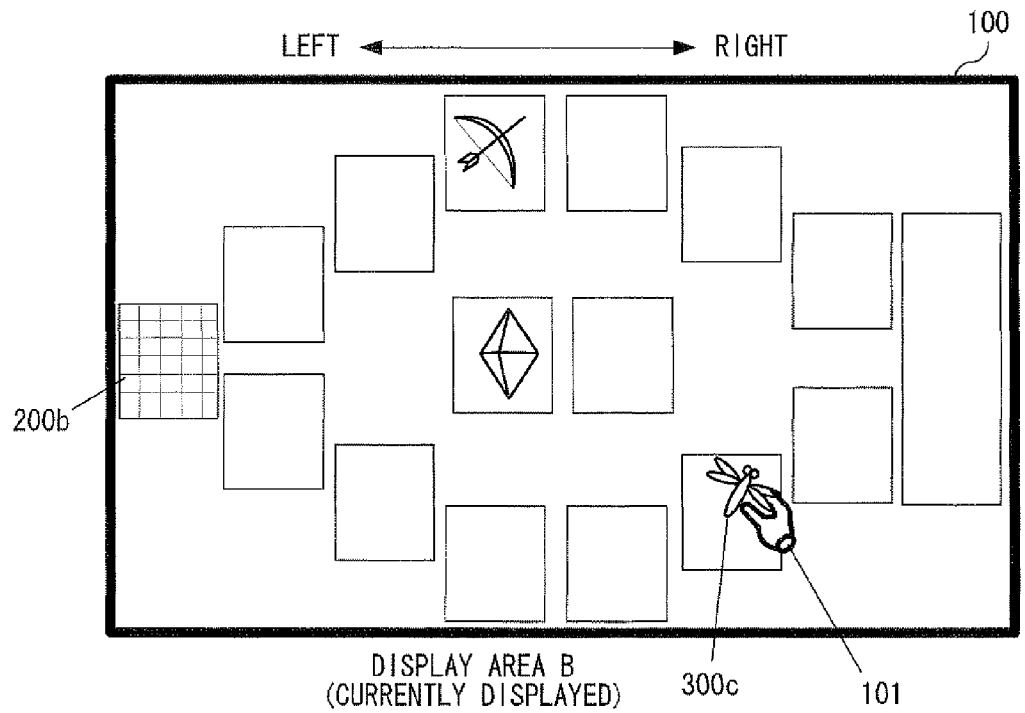
FIG. 21A shows the screen 100 on which the display area A has been switched to the display area B as shown in FIG. 20A and FIG. 20B.
Figure 21B:
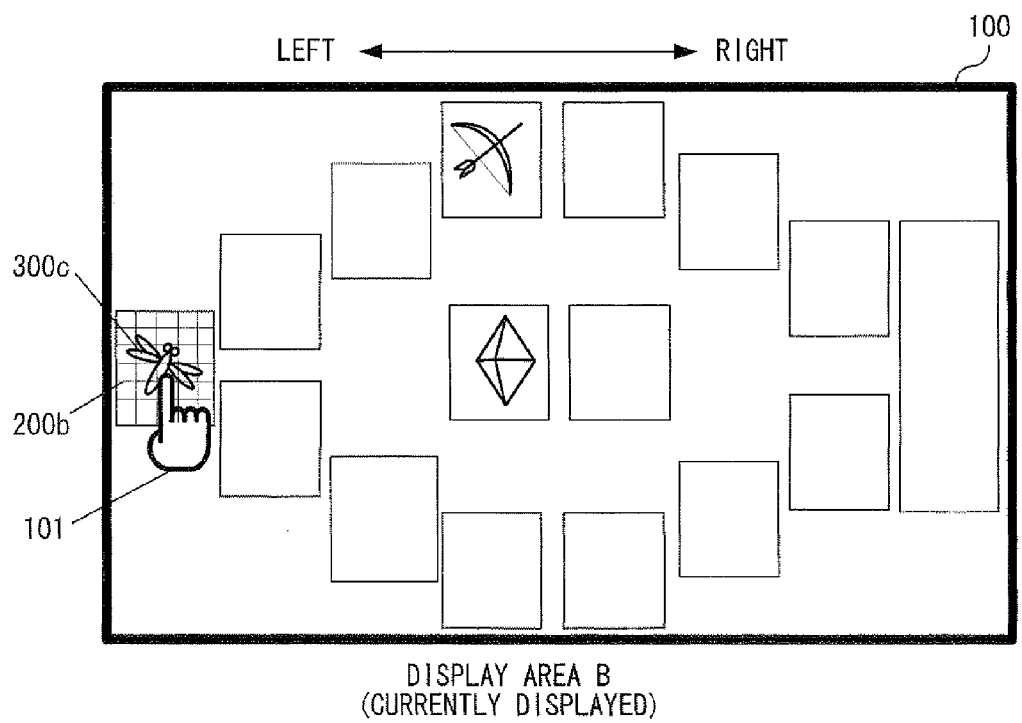
FIG. 21B shows the screen 100 on which the display area A has been switched to the display area B as shown in FIG. 20A and FIG. 20B.

FIG. 21A shows the screen 100 on which the display area A has been switched to the display area B as shown in FIG. 20A and FIG. 20B. In this state, the player is pressing the A button of the unit-equipped controller 6 and the bug item 300c remain determined as a target item to be moved. Then, when the A button is released from being pressed by the player, as shown in FIG. 21B, the bug item 300c and the pointer 101 are moved to above the bug cage type positioning area 200b in the display area B after the movement, which is associated in advance with the bug cage type positioning area 200b (see FIG. 8) in the display area A in which the bug item 300c has been positioned before the movement and positioned in the positioning area 200b in the display area B. It should be noted that, when positioning the item, as shown in FIG. 21B, a display of the bug item 300c being lifted up by the pointer 101 is cancelled and a display of the bug item 300c put in the positioning area 200b indicating that the bug item 300c is no longer a target item to be moved is displayed.

As described above, in the present embodiment, the player performs an operation of changing the orientation of the unit-equipped controller 6 and thereby moves the pointer 101 to above an item which the player intends to move (see FIG. 8), presses the A button to determine the item as a target item to be moved, performs an operation of waving the unit-equipped controller 6 and thereby switches the currently displayed display area on the screen 100 to an other display area, moves the target item to be moved to the other display area (see FIG. 12), and then releases the A button and thereby positions the target item to be moved in the other display area. That is, according to the present embodiment, by performing a button operation of pressing and releasing the A button and an operation of moving the unit-equipped controller 6, the player can move a desired item to another display area quickly. This operation is similar to a human action of grasping a stuff (item) and moving the stuff to another position. Thus, according to the present embodiment, the player can perform an operation of selecting an item (object) and moving the item to another display area intuitively with improved operability.

[Details of Game Processing]

Next, game processing performed on the game system 1 will be described in detail. Firstly, with reference to FIG. 22, main data used in game processing according to the present embodiment will be described. It should be noted that FIG. 22 illustrates the main data and programs stored in the external main memory 12 and/or the internal main memory 35 (hereinafter, these two main memories are collectively referred to as a main memory) of the game apparatus body 5.

Figure 22:
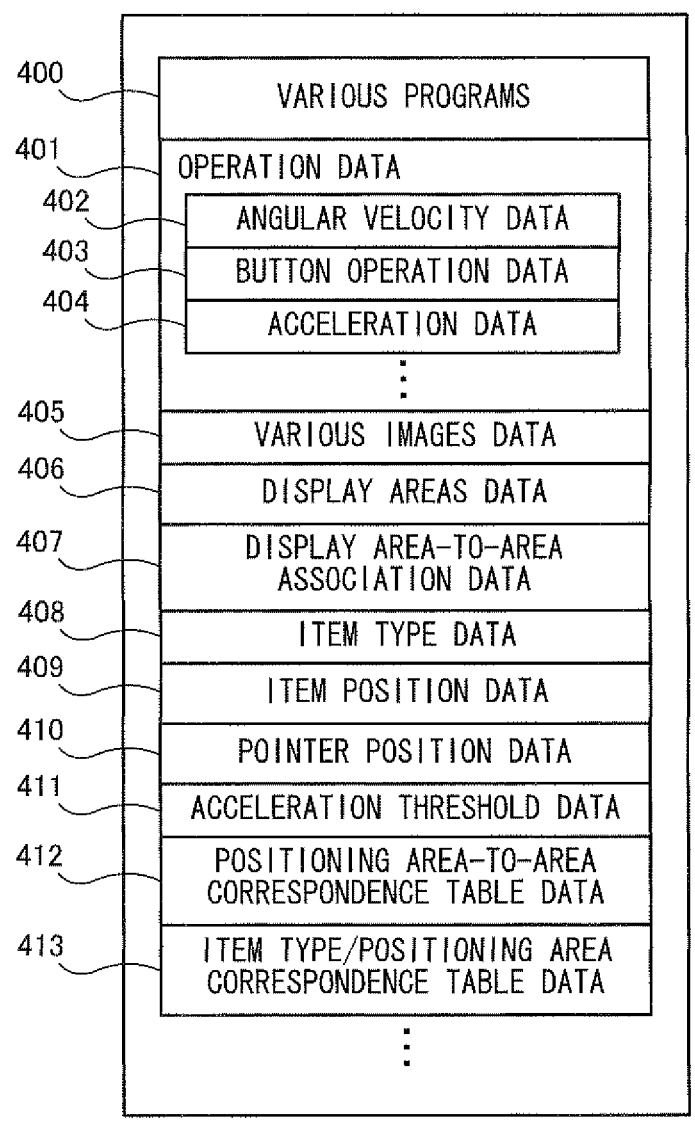
FIG. 22 illustrates main data used in game processing of the present embodiment.

As shown in FIG. 22, a data storage area of the main memory stores operation data 401, various images data 405, display areas data 406, display area-to-area association data 407, item type data 408, item position data 409, pointer position data 410, acceleration threshold data 411, positioning area-to-area correspondence table data 412, item type/positioning area correspondence table data 413, and the like. It should be noted that the main memory stores data necessary for the game processing other than the data shown in FIG. 22. Further, a program memory area of the main memory stores various programs 400 which configures the game program.

The operation data 401 is operation information transmitted from the unit-equipped controller 6 to the game apparatus body 5 and includes angular velocity data 402, button operation data 403, acceleration data 404, and the like.

The angular velocity data 402 is data indicating angular velocities detected by the gyro-sensors 95 and 96 in the angular velocity detection unit 9. Specifically, the angular velocity data 402 is data indicating the angular velocities applied to the unit-equipped controller 6 and includes X-axis angular velocity data indicating an angular velocity around the X-axis, Y-axis angular velocity data indicating an angular velocity around the Y-axis, and Z-axis angular velocity data indicating an angular velocity around the Z-axis, which are detected by the gyro-sensors 95 and 96.

The button operation data 403 is data indicating that the respective operation buttons (e.g., A button) of the controller 7 are operated.

The acceleration data 404 is data indicating the acceleration detected by the acceleration sensor 701. Specifically, the acceleration data 404 is data indicating acceleration applied to the controller 7 (the unit-equipped controller 6) and includes X-axis direction acceleration data indicating an acceleration with respect to an X-axis component, Y-axis direction acceleration data indicating an acceleration with respect to a Y-axis component, and Z-axis direction acceleration data indicating an acceleration with respect to a Z-axis component, which are detected by the acceleration sensor 701.

It should be noted that the wireless controller module 19 provided in the game apparatus body 5 receives acceleration data and angular velocity data included in the operation information transmitted from the unit-equipped controller 6 at predetermined cycles (e.g., every 1/200 sec), and stores the data in a buffer not shown which is provided in the wireless controller module 19. Then, every frame (e.g., every 1/60 sec) which corresponds to a game process period, the acceleration data and the angular velocity data stored in the buffer during the frame period are loaded, and the acceleration data 404 and the angular velocity data 402 in the main memory are updated.

The various images data 405 is data indicating various images which are displayed on the screen 100. Specifically, the various images data 405 is data indicating images which configure the display areas A to C, images of respective items, images of the pointer 101, and the like.

The display areas data 406 is data relating to the display areas A to C and indicates the number, positions, and seizes, and the like of positioning areas in each display area.

The display area-to-area association data 407 is data indicating a predetermined sequence in which the display areas A to C are associated with one another.

The item type data 408 is data indicating a type of an item, which indicates whether the item is a normal item or a special item, and when the item is a special item, what the item is.

The item position data 409 is data indicating positions of respective items positioned in the display areas A to C.

The pointer position data 410 is data indicating the position of the pointer 101 in the currently displayed display area on the screen 100.

The acceleration threshold data 411 is data indicating a predetermined acceleration and is data used to determine whether the currently displayed display area on the screen 100 is to be switched.

The positioning area-to-area correspondence table data 412 is data indicating a table in which positioning areas in the display areas A to C are associated with one another.

The item type/positioning area correspondence table data 413 is data indicating a table in which types of special items (sword item, bug item) are associated with positioning areas in the display areas A to C.

Next, with reference to flow charts shown in FIGS. 23 and 24, processing performed by the CPU 10 based on the programs stored in the main memory will be described. It should be noted that the processing of the flow charts shown in FIGS. 23 and 24 progresses as process steps are repeated every frame (e.g., 1/60 sec).

Firstly, in step S1, the CPU 10 gives an instruction to the GPU 32 to render a display area which is a target to be displayed and display the display are on the screen 100 of the monitor 2 (see FIG. 8, and the like). At this time, the GPU 32 renders the display area which is a target to be displayed by using the various images data 405, the display areas data 406, the item position data 409, the pointer position data 410, and the like. Then, the CPU 10 shifts the processing to step S2.

In step S2, the CPU 10 obtains the angular velocity data 402 from the main memory. Then, the CPU 10 shifts the processing to step S3.

In step S3, based on the angular velocity data 402 obtained in step S2, the CPU 10 moves the position of the pointer 101 displayed on the screen 100 (see FIG. 8). Specifically, the angular velocities indicated by the angular velocity data 402 are associated with the moving amount of the pointer 101, and the CPU 10 moves the pointer 101 in the longitudinal direction of the screen 100 in accordance with the X-axis angular velocity data and moves the pointer 101 in the left-right direction of the screen 100 in accordance with the Y-axis angular velocity data. It should be noted that, based on the initial setting, for example, a particular orientation of the unit-equipped controller 6 is associated with the initial position (e.g., the center position of the screen 100) of the pointer 101. Then, the CPU 10 shifts the processing to step S4.

In step S4, with reference to the button operation data 403, the CPU 10 determines whether the A button of the unit-equipped controller 6 has been pressed. When the determination result in step S4 is YES, the CPU 10 shifts the processing to step S5 while when the determination result in step S4 is NO, the CPU 10 returns the processing to step S1. While the processes of steps S1 to S4 are repeated, the player can move the pointer 101 to a desired position by moving the unit-equipped controller 6 (see FIG. 8).

In step S5, with reference to the item position data 409 and the pointer position data 410, the CPU 10 determines whether the pointer 101 designates any item. When the determination result in step S5 is YES (see FIG. 10 and the like), the CPU 10 shifts the processing to step S6 while when the determination result in step S5 is NO, the CPU 10 returns the processing to step S1.

In step S6, the CPU 10 determines the item determined to be designated by the pointer 101 in step 5 as a target item to be moved. At this time, the CPU 10 displays the pointer 101 which represents a hand grasping the target item to be moved (see FIG. 11 and the like). Then, the CPU 10 shifts the processing to step S7.

In step S7, the CPU 10 fixes positions of the target item to be moved and the pointer 101 in the virtual space. That is, the CPU 10 fixes the positions of the target item to be moved and the pointer 101 so as not to move even when the unit-equipped controller 6 moves. Then, the CPU shifts the processing to step S8.

In step S8, the CPU 10 obtains the acceleration data 404. Then, the CPU 10 shifts the processing to step S9.

In step S9, based on the acceleration data 404 and the acceleration threshold data 411 obtained in step S8, the CPU 10 determines whether the acceleration of the unit-equipped controller 6 in the right direction is greater than or equal to a predetermined value. Specifically, the CPU 10 determines whether the acceleration (negative acceleration in this case) indicated by the X-axis direction acceleration data included in the acceleration data 404 is lower than or equal to a predetermined negative acceleration indicated by the acceleration threshold data 411 and thereby determines whether the player has performed an operation of waving the unit-equipped controller 6 in the right direction with a momentum of or greater than a predetermined value (see FIG. 15). When the determination result in step S9 is YES, the CPU 10 shifts the processing to step S13 while when the determination result in step S9 is NO, the CPU 10 shifts the processing to step S10.

In step S13, the CPU 10 shifts the display area in the right direction and thereby switches the display area displayed on the screen 100 to another display area (see FIG. 15). Specifically, with reference to the display area-to-area association data 407, the CPU 10 switches the currently displayed display area (the display area A in FIG. 15) to the display area (the display area C in FIG. 15) positioned to the left of the currently displayed display area as a new display area so as to display on the screen 100 (see FIGS. 16A, 16B, 17A). At this time, having been fixed in step S7, the target item to be moved and the pointer 101 do not move in accordance with the operation of waving the unit-equipped controller 6 with respect to which the determination has been made in step S9. Then, the CPU 10 shifts the processing to step S15.

In step S10, based on the acceleration data 404 and the acceleration threshold data 411 obtained in step S8, the CPU 10 determines whether the acceleration of the unit-equipped controller 6 in the left direction is greater than or equal to a predetermined value. Specifically, the CPU 10 determines whether the acceleration (positive acceleration in this case) indicated by the X-axis direction acceleration data included in the acceleration data 404 is greater than or equal to a predetermined positive acceleration indicated by the acceleration threshold data 411 and thereby determines whether the player has performed an operation of waving the unit-equipped controller 6 in the left direction with a momentum of or greater than a predetermined value (see FIG. 15). When the determination result in step S10 is YES, the CPU 10 shifts the processing to step S14 while when the determination result in step S10 is NO, the CPU 10 shifts the processing to step S11.

In step S14, the CPU 10 shifts the display area in the left direction and thereby switches the display area displayed on the screen 100 to another display area (see FIG. 12). Specifically, with reference to the display area-to-area association data 407, the CPU 10 switches the currently displayed display are (the display area A in FIG. 12) to the display area (the display area B in FIG. 12) positioned to the right of the currently displayed display area as a new display area so as to display on the screen 100 (see FIGS. 13A, 13B, 14A). At this time, having been fixed in step S7, the target item to be moved and the pointer 101 do not move in accordance with the operation of waving the unit-equipped controller 6 with respect to which the determination has been made in step S10. Then, the CPU 10 shifts the processing to step S15.

In step S11, with reference to the button operation data 403, the CPU 10 determines whether the A button of the unit-equipped controller 6 has been released from being pressed. When the determination result in step S11 is YES, the CPU 10 shifts the processing to step S12 while when the determination result in step S11 is NO, the CPU 10 shifts the processing to step S20.

In step S20, as in the same manner as in step S1, the CPU 10 gives an instruction to the GPU 32 to render a display area which is a target to be displayed to display the display area on the screen 100 of the monitor 2 (see FIG. 11 and the like). Then, the CPU 10 returns the processing to step S8.

In step S12, the CPU 10 releases the target item to be moved and the pointer 101 fixed in step S7 from being fixed. Then, the CPU 10 returns the processing to step S1.

In step S15, with reference to the button operation data 403, the CPU 10 determines whether the A button of the unit-equipped controller 6 has been released from being pressed. When the determination result in step S15 is YES, the CPU 10 shifts the processing to step S16 while when the determination result in step S15 is NO, the CPU 10 shifts the processing to step S20 and then returns to step S8. That is, when the player waves the unit-equipped controller 6 in the right direction in a state where the A button is being pressed so as to determine the target item to be moved, the display area can be switched in the right direction while when the player waves the unit-equipped controller 6 in the left direction in the above state, the display area can be switched in the left direction.

Figure 24:
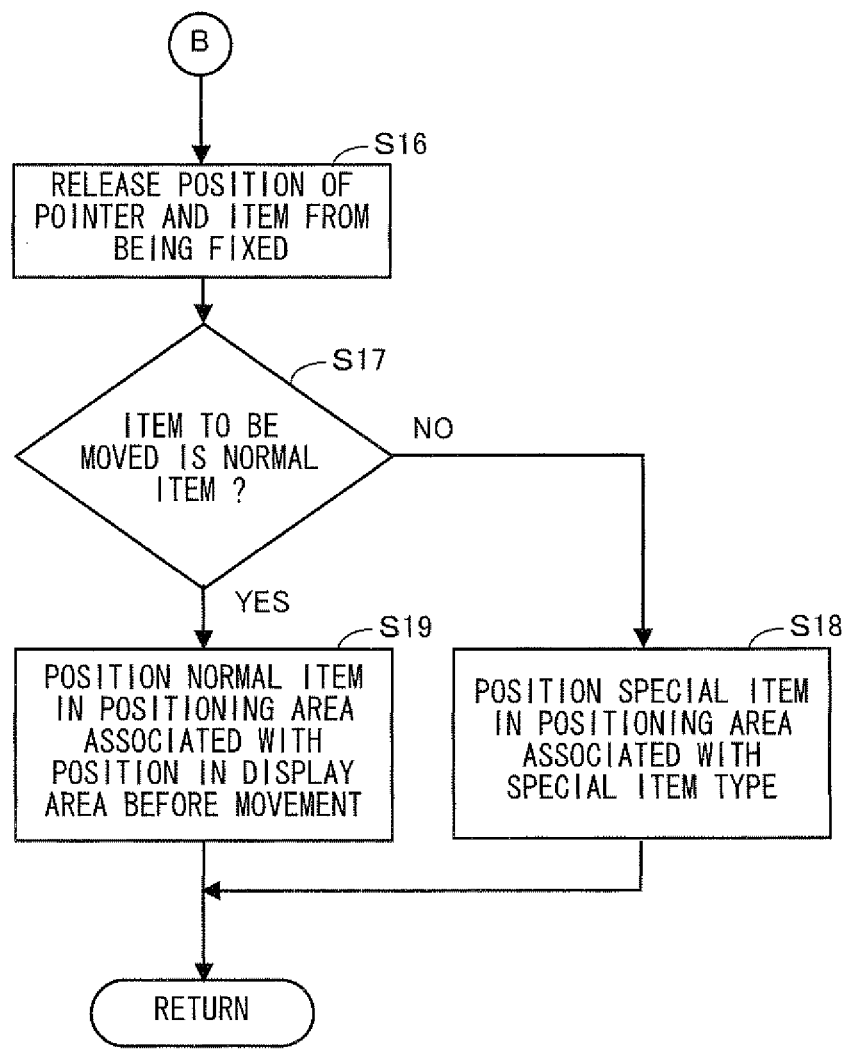
FIG. 24 is a flow chart illustrating processing performed by the CPU 10 according to the present embodiment.

In step S16 of FIG. 24, the CPU 10 releases the target item to be moved and the pointer 101 fixed in step S7 from being fixed. Then, the CPU 10 shifts the processing to step S17.

In step S17, with reference to the item type data 408, the CPU 10 determines whether the target item to be moved is a normal item. Specifically, with reference to the item type data 408, the CPU 10 determines whether the target item to be moved is a normal item such as the clothes item 300a and the like or a special item such as the sword item 300d and the like (see FIG. 8). When the item to be moved is a normal item (YES in step S17), the CPU 10 shifts the processing to step S19 while when the item to be moved is a special item (NO in step S17), the CPU 10 shifts the processing to step S18.

In step S18, with reference to the item type/positioning area correspondence table data 413, the CPU 10 positions the special item in a positioning area associated with the special item to be moved in a new display area. Specifically, as shown in FIGS. 19A and 19B, the CPU 10 positions the sword item 300d in the positioning area 200c associated with the item. Alternatively, as shown in FIGS. 21A and 21B, the CPU 10 positions the bug item 300c in the positioning area 200b associated with the item. It should be noted that, when positioning a special item to be moved, if the position at which the item has been released from being fixed in step S16 is different from the position of the positioning area in which the special item to be moved is to be positioned, as shown in FIGS. 19A, 19B, and the like, the CPU 10 moves the special item to be moved and the pointer 101 to the positioning area. Further, when the special item to be moved has been positioned, the CPU 10 displays the pointer 101 having released the special item (see FIG. 19B and the like). Then, the CPU 10 returns the processing to step S1 of FIG. 23.

In step S19, with reference to the positioning area-to-area correspondence table data 412, the CPU 10 positions the normal item in a positioning area in a new display area associated with the positioning area in which the normal item to be moved has been positioned in the display area before the display area is switched. For example, as shown in FIGS. 14A and 14B, the CPU 10 positions the clothes item 300a in the positioning area 200a associated with the item. It should be noted that, when positioning a normal item to be moved, if the position at which the item has been released from being fixed in step S16 is different from the position of the positioning area in which the normal item to be moved is to be positioned, as shown in FIGS. 14A and 14B, the CPU 10 moves the normal item to be moved and the pointer 101 in the positioning area. Further, when the normal item to be moved has been positioned, the CPU 10 displays the pointer 101 having released the normal item (see FIG. 14B and the like). Then, the CPU 10 returns the processing to step S1 of FIG. 23.

As described above, according to the present embodiment, by performing a button operation of pressing and releasing the A button and an operation of moving the unit-equipped controller 6, the player can move a desired item to another display area quickly. This operation is similar to a human action of grasping a stuff (item) and moving the stuff to another position. Thus, according to the present embodiment, the player can perform an operation of selecting an item and moving the item to another display area intuitively with improved operability.

Further, in the present embodiment, an item is fixed during the item is determined as a target item to be moved. Accordingly, the target item to be moved does not move when the display area is switched, thereby preventing the player from losing sight of the target item to be moved.

Further, in the present embodiment, positioning areas in the respective display areas are associated with one another, and thus, when a normal item is moved from a display area to another display area having a different layout of positioning areas, the normal item is positioned automatically in an associated positioning area. Accordingly, the player does not need to perform a cumbersome operation of moving a normal item so as to position the normal item in a positioning area.

Further, in the present embodiment, a special item is associated with a positioning area in which the special item should be positioned, and thus, when the special item is moved to a new display area, the special item is positioned in the associated positioning area automatically. Accordingly, the player does not need to perform a cumbersome operation of moving the special item so as to position the special item in a positioning area in which the special item is to be positioned.

[Modification]

Figure 25:
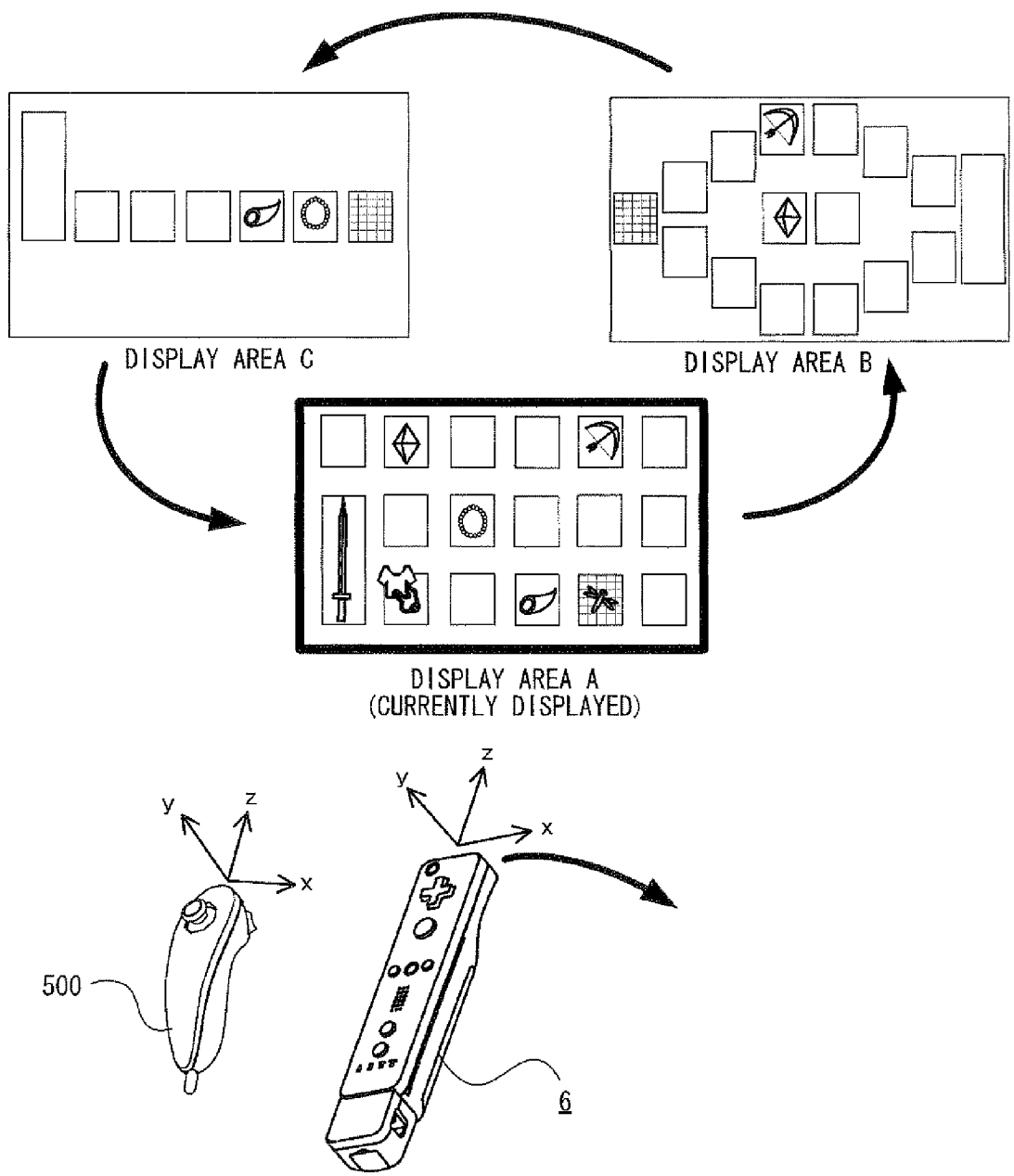
FIG. 25 illustrates a modification of the present embodiment.

It should be noted that, in the present embodiment, the display area is switched by performing an operation using only the unit-equipped controller 6 (see FIG. 12 and the like). However, as shown in FIG. 25, for example, an extended controller 500 may be used in addition to the unit-equipped controller 6 to perform an operation of switching the display area. It should be noted that the extended controller 500 is electrically connected to the unit-equipped controller 6 via a cable (not shown). Further, the player grasps the unit-equipped controller 6 with his/her right hand and grasps the extended controller 500 with his/her left hand, and performs an operation.

Figure 26:
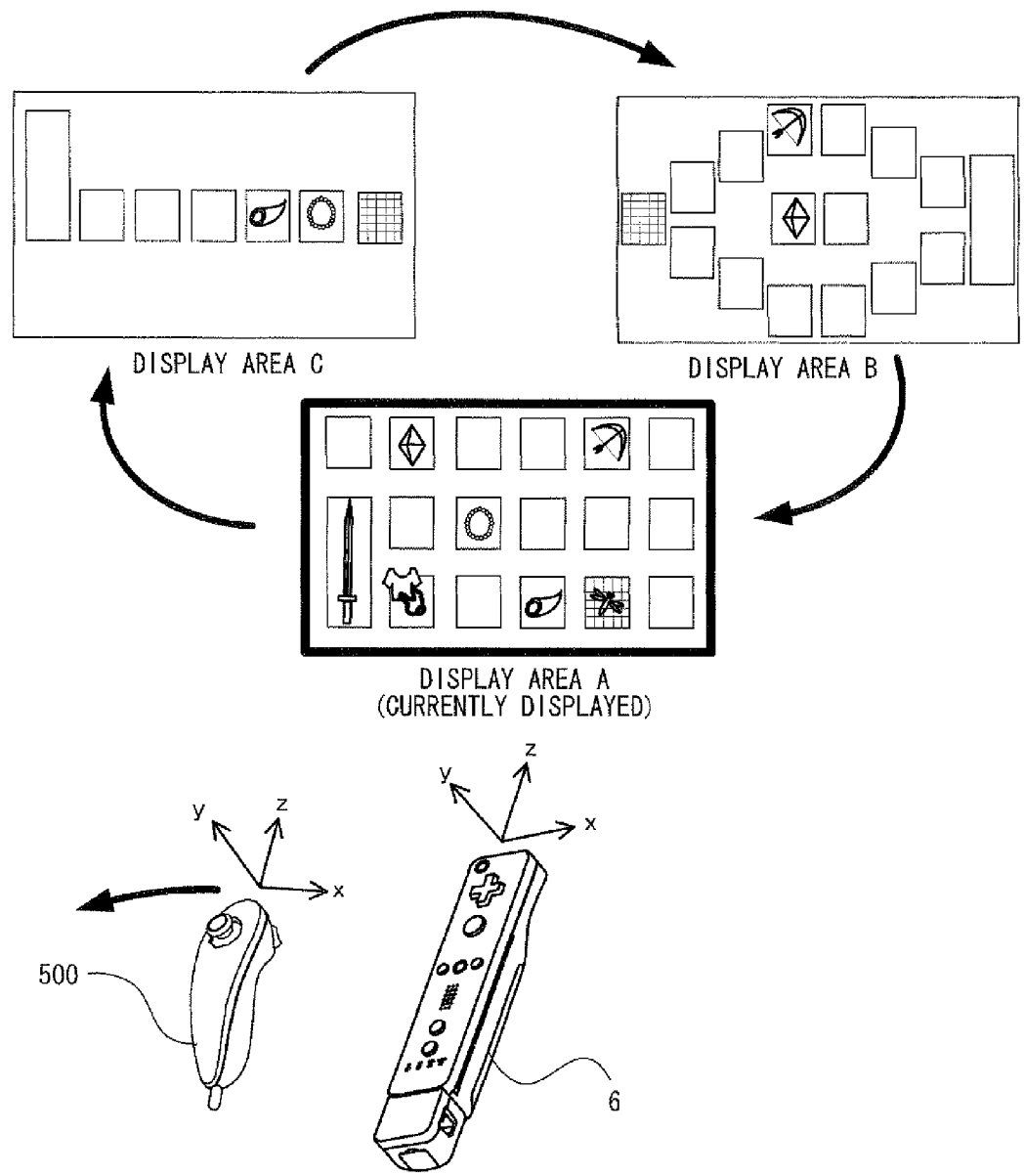
FIG. 26 illustrates another modification of the present embodiment.

In the following, a detailed description will be made. The extended controller 500 includes an acceleration sensor similar to the acceleration sensor 701 included in the unit-equipped controller 6, and can detect, as in the same manner as the unit-equipped controller 6, accelerations in an X-axis, Y-axis and Z-axis directions (see FIG. 25). The unit-equipped controller 6 transmits, to the game apparatus body 5, acceleration data detected by the acceleration sensor 701 as well as acceleration data detected by the acceleration sensor of the extended controller 500. Then, as shown in FIG. 25, when an operation of waving the unit-equipped controller 6 in an X-axis positive direction is performed, the game apparatus body 5 shifts the display area in the right direction whereby switches the display area. Further, as shown in FIG. 26, when an operation of waving the extended controller 500 in an X-axis negative direction is performed, the game apparatus body 5 shifts the display area in the left direction whereby switches the display area.

Figure 27:
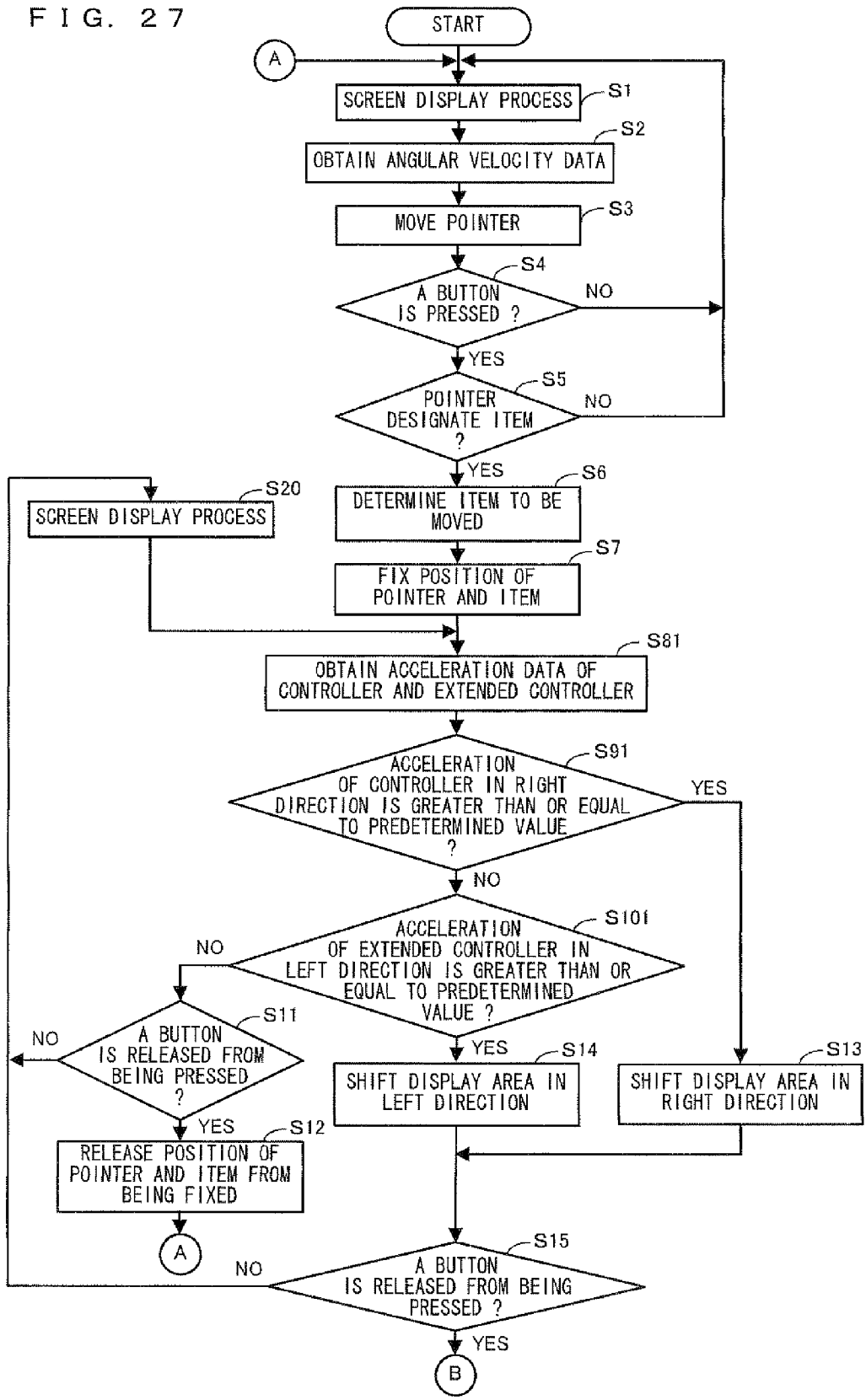
FIG. 27 is a flow chart illustrating a modification of the present embodiment.

FIG. 27 is a flow chart illustrating processing performed in the above configuration. The flow chart of FIG. 27 is equivalent to the flow chart of FIG. 23 except that the processes of steps 8, S9, S10 are replaced with steps 81, S91, S101, respectively. It should be noted that, a process performed when a determination result in step S15 of FIG. 27 is YES is the same as that shown in FIG. 24, and thus description thereof will be omitted. In step S81, the CPU 10 obtains the acceleration data 404 and thereby obtains acceleration data of the unit-equipped controller 6 and the extended controller 500. In step 91, based on the acceleration data 404 and the acceleration threshold data 411 obtained in step S81, the CPU 10 determines whether acceleration of the unit-equipped controller 6 in the right direction is greater than or equal to a predetermined value. In step S101, based on the acceleration data 404 and the acceleration threshold data 411 obtained in step S81, the CPU 10 determines whether acceleration of the extended controller 500 in the left direction is greater than or equal to a predetermined value.

As described above, in a modification of present embodiment, by waving the unit-equipped controller 6 grasped with his/her right hand, the player can shift the display area in the right direction and thereby switch the display area, and by waving the extended controller 500 grasped with his/her left hand, the player can shift the display area in the left direction and thereby switch the display area. Accordingly, in the same manner as in the present embodiment, the player can select an item and move the item to another display screen intuitively with improved operability.

It should be noted that, in the present modification, for example, the display area may be shifted in the right direction so as to be switched when the unit-equipped controller 6 is waved in any direction, and the display area may be shifted in the left direction so as to be switched when the extended controller 500 is waved in any direction. Further, in the configuration of the present modification, for example, display area may be shifted in the d right direction so as to be switched when the unit-equipped controller 6 is waved in the longitudinal direction, and the display area may be shifted in the left direction so as to be switched when the extended controller 500 is waved in the longitudinal direction. In this manner, in the configuration of the present modification, the display area may be switched in a predetermined direction in accordance with a predetermined movement of the unit-equipped controller 6, and the display area may be switched in a predetermined direction different from the above predetermined direction in accordance with a predetermined movement of the extended controller 500.

Further, in the present embodiment described above with reference to FIGS. 23 and 24, the positions of the pointer 101 and the determined item are fixed (see S6 and S7 of FIG. 23) at a time when the target item to be moved is determined. However, in the present embodiment described above, even when the target item to be moved is determined, the pointer 101 and the determined item may be moved in accordance with an operation of waving the unit-equipped controller 6 by the player without being fixed. That is, in the same manner as in the operation of moving the pointer 101 within the screen 100 as described with reference to FIG. 8, the target item to be moved and the pointer 101 grasping the target item (see FIG. 11 and the like) may be moved within the screen 100.

Figure 28:
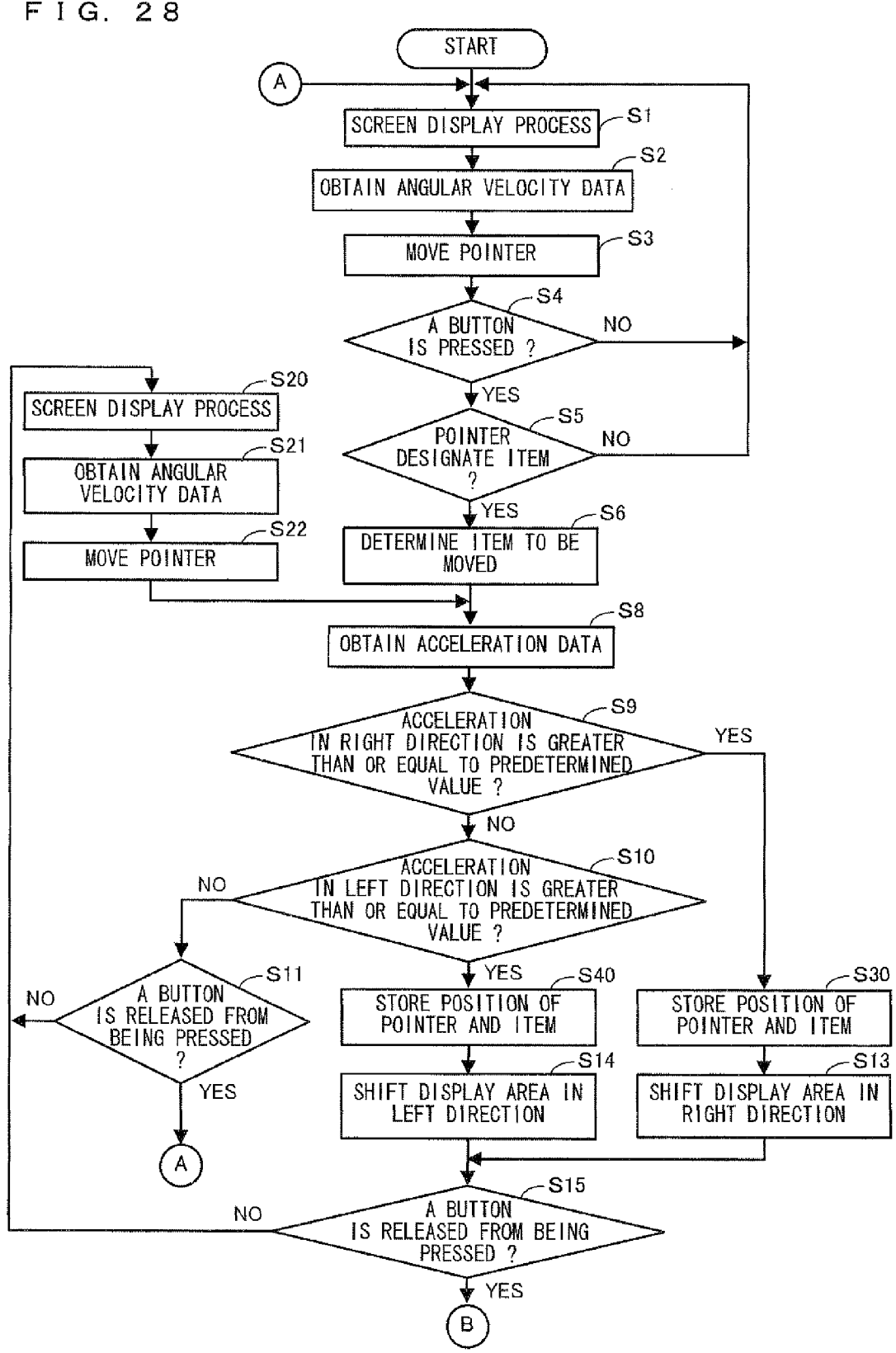
FIG. 28 is a flow chart illustrating another modification of the present embodiment.
Figure 29:
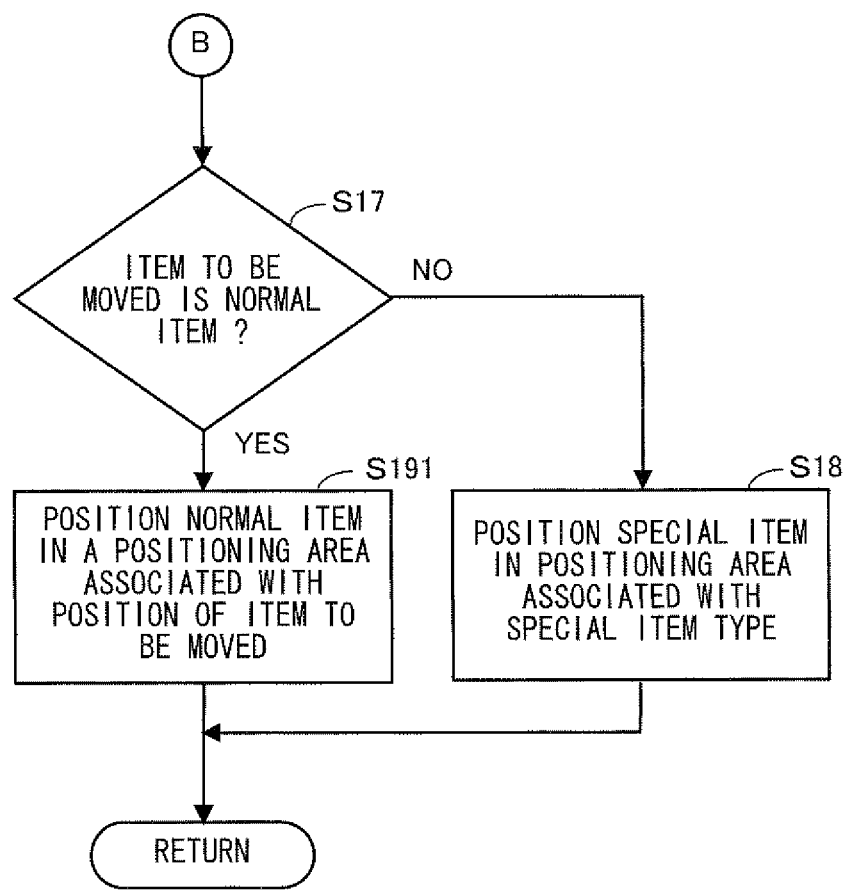
FIG. 29 is a flow chart illustrating another modification of the present embodiment.

In the following, a detailed description will be made with reference to FIGS. 28 and 29. FIGS. 28 and 29 are flow charts illustrating processing performed in the above configuration. The flow chart of FIG. 28 is equivalent to the flow chart of FIG. 23 except that the processes of steps S7 and S12 are omitted and a process of step S30 is added immediately preceding the process of step S13, a process of step S40 is added immediately preceding the process of step S14, and processes of steps S21 and S22 are added immediately following the process of step S20. The flow chart of FIG. 29 is equivalent to the flow chart of FIG. 24 except that the process of step S16 is omitted and the process of step S19 is replaced with a process of step S191.

When the determination result in step S9 of FIG. 28 is YES, in step S30, the CPU 10 stores, in the main memory, the positions (coordinates) of the pointer 101 and the target item to be moved in the currently displayed display area on the screen 100. Then, the CPU 10 shifts the processing to step S13 and the display area is shifted in the right direction so as to be switched. At this time, the pointer 101 and the target item to be moved are displayed at the positions (coordinates) in a new display area, which are stored as described above. When the determination result in step S10 is YES, in step S40, the CPU 10 stores, in the main memory, the positions (coordinates) of the pointer 101 and the target item to be moved in the currently displayed display area on the screen 100 as in the same manner as in step S30. Then, the CPU 10 shifts the processing to step S14, and the display area is shifted in the left direction so as to be switched. At this time, the pointer 101 and the target item to be moved are displayed at the positions (coordinates) in a new display area, which are stored as described above.

After the screen display process is performed in step S20, in step S21, the CPU 10 obtains the angular velocity data 402 from the main memory as in the same manner as in step S2. Then, in step S22, based on the angular velocity data 402 obtained in step S21, the CPU 10 moves the target item to be moved determined in step S6 and the pointer 101 grasping the item.

When the determination result in step S17 of FIG. 29 is YES, in step S191, with reference to the item position data 409 and the display areas data 406, the CPU 10 positions the normal item in a positioning area in a new display area associated with the position of the normal item to be moved in the new display area. Typically, in step S191, the CPU 10 positions the normal item in a closest positioning area in the new display area to the position of the normal item to be moved in the new display area. Then, the CPU 10 returns the processing to step S1 of FIG. 28.

With the configuration described with reference to FIGS. 28 and 29, the player can, after determining the target item to be moved (S6 of FIG. 28), move the target item to be moved freely within the screen 100 (S20 to S22 of FIG. 28). Then, after moving the target item to be moved to a desired position within the screen 100, the player switches the display area (S13 or S14 of FIG. 28). The position of the target item to be moved on the screen 100 does not change before and after the switching (S30 and S13 or S40 and S14 of FIG. 28), thereby preventing the player from losing sight of the target item to be moved. Then, the player can move the target item to be moved freely within the screen 100 (within the new display area) (S20 to S22 of FIG. 28). Then, when the target item to be moved is a normal item, the player can position, in the new display area, the target item to be moved in a positioning area (typically, the closest positioning area to the target item to be moved) associated with the position of the target item to be moved.

Figure 23:
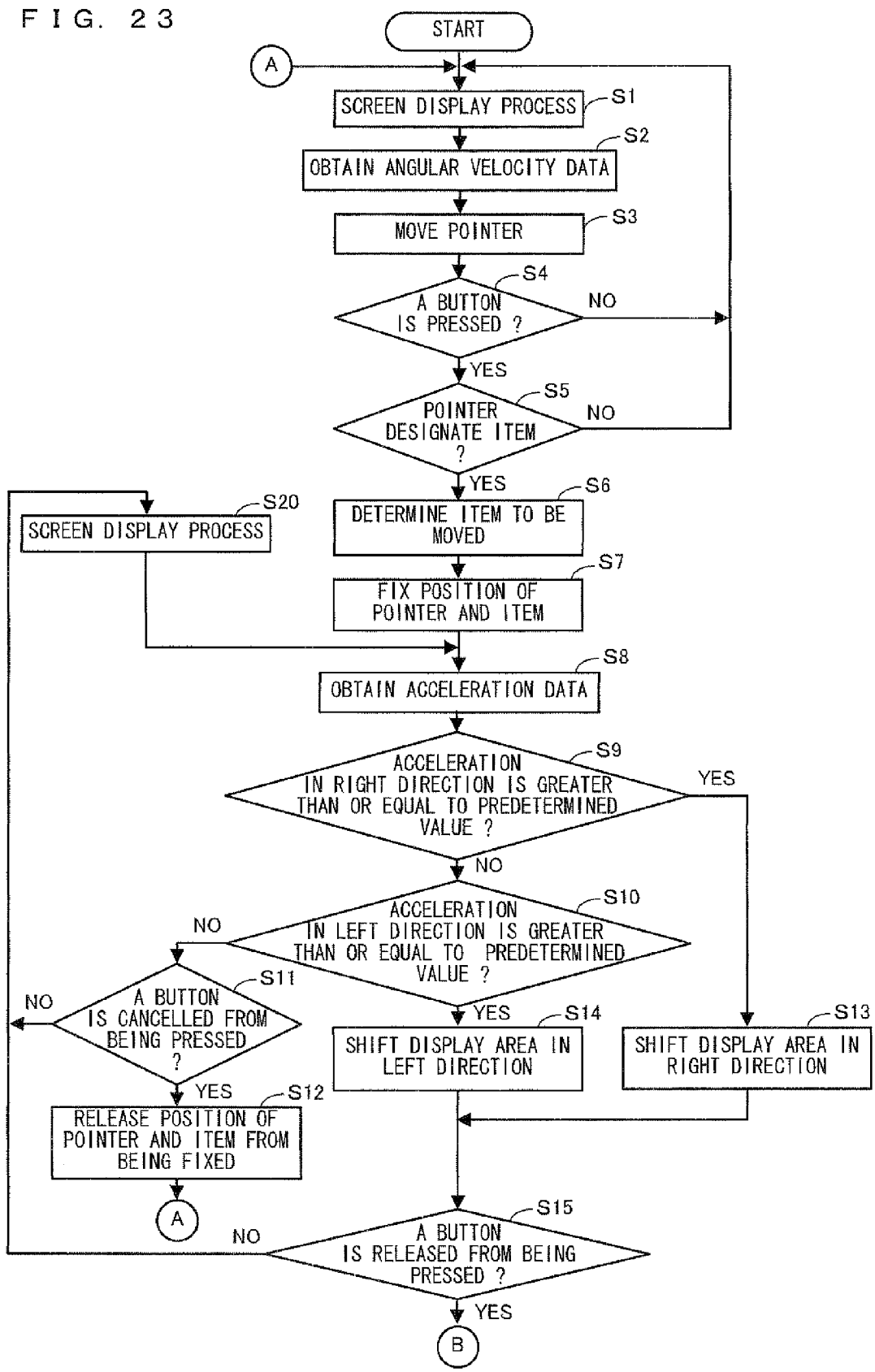
FIG. 23 is a flow chart illustrating processing performed by a CPU 10 according to the present embodiment.

It should be noted that, in the flow chart of FIG. 28, the process (process of fixing the target item to be moved, and the like) of step S7 of FIG. 23 is not performed, and thus it is preferable that an acceleration threshold used for determining whether the acceleration is greater than or equal to the predetermined value in steps S9 and S10 is set to a relatively great value. Specifically, it is preferable that the acceleration threshold is set to a great value that does not cause the display area to be switched by an operation performed by the player of moving a target item to be moved within the screen 100 during the processes of steps S20 to S22 of FIG. 28. Consequently, the display area can be prevented from being switched because the process of step S13 or S14 is performed against the player's will during the player is performing an operation of moving the target item to be moved within the screen 100.

In the configuration described above with reference to FIGS. 28 and 29, in step S191, the normal item is positioned in the positioning area, in the new display area, associated with the position of the normal item to be moved in the new display area. However, in step S191 in the configuration describe above with reference to FIGS. 28 and 29, the normal item may be positioned in a positioning area in a new display area associated with the position stored in the process of step S30 or S40. That is, in step S191, the normal item may be positioned in a positioning area in a new display area (typically, the closest positioning area in the new display area to the position of the target item to be moved immediately before the switching in the display area before the switching) associated with the position of the normal item to be moved immediately before the switching of the display area.

Figure 30:
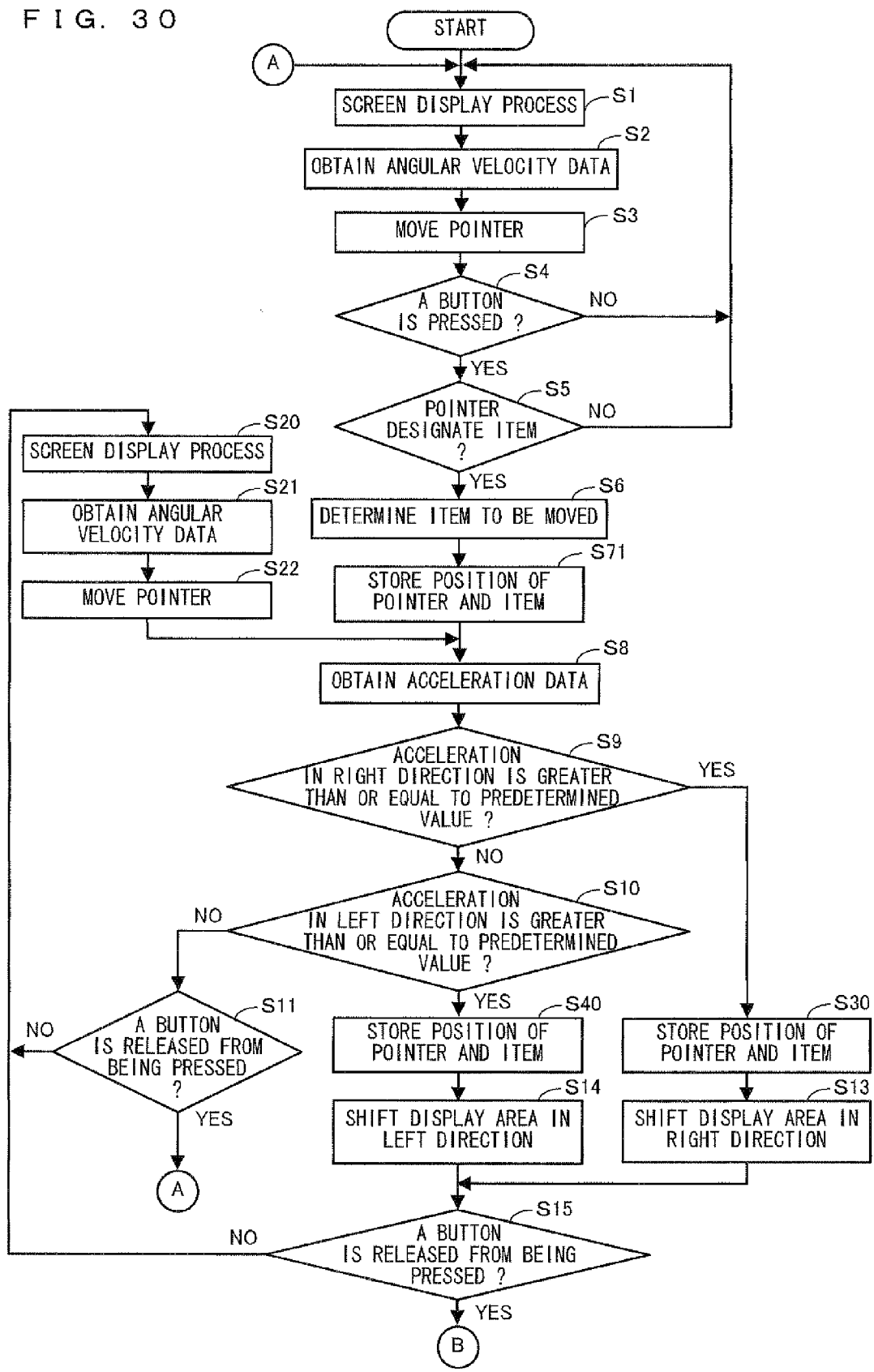
FIG. 30 is a flow chart illustrating another modification of the present embodiment.
Figure 31:
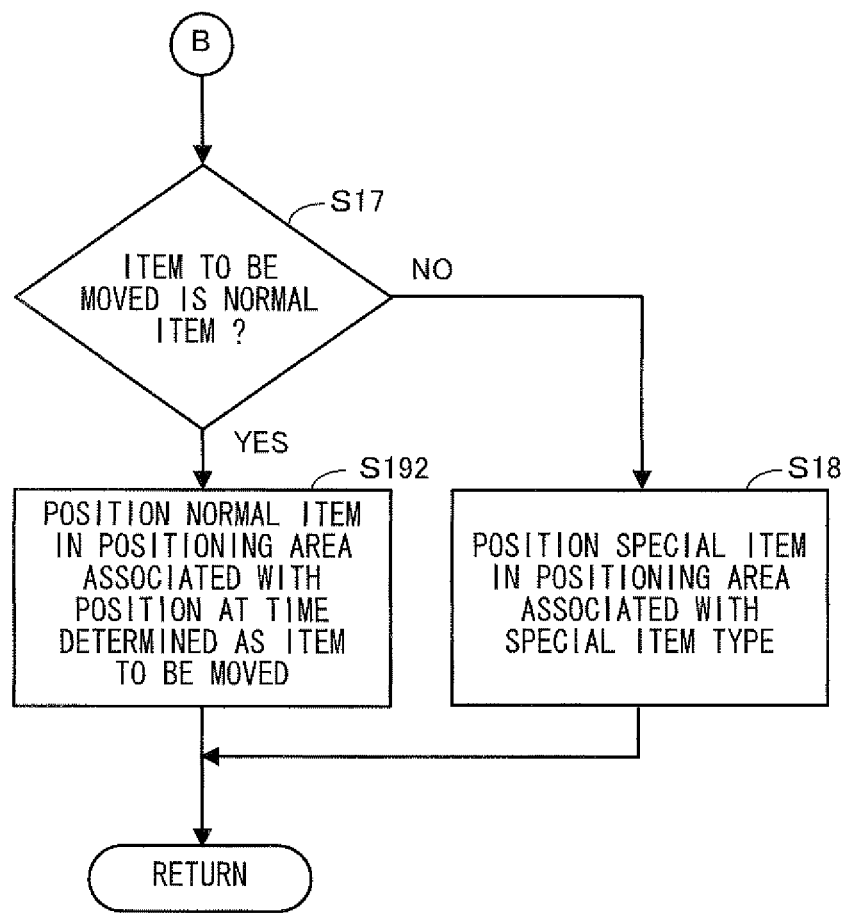
FIG. 31 is a flow chart illustrating another modification of the present embodiment.

The configuration described above with reference to FIGS. 28 and 29 may be further modified to a configuration shown in FIGS. 30 and 31. A flow chart of FIG. 30 is equivalent to the flow chart of FIG. 28 except that a process of step S71 is added immediately following the process of step S6. A flow chart of FIG. 31 is equivalent to the flow chart of FIG. 29 except that the process of step S191 is replaced with a process of step S192. In the following, a detailed description will be made with reference to FIGS. 30 and 31.

After the target item to be moved is determined in step S6 of FIG. 30, in step S71, the CPU 10 stores, in the main memory, positions (coordinates) of the target item to be moved and the pointer 101 grasping the item in the currently displayed display area on the screen 100. Then, the CPU 10 shifts the processing to step S8.

When the determination result in step S17 of FIG. 31 is YES, in step S192, the CPU 10 positions the item in a positioning area in a new display area associated with the position (coordinates) in the display area of the item at the time when the item is determined as a target item to be moved, which is stored in step S71 of FIG. 30. Typically, in step S192, the CPU 10 positions the item in the closest positioning area in the new display area to the position (coordinates) in the display area at the time when the item is determined as a target item to be moved, which is stored in step S71 of FIG. 30. Then, the CPU 10 returns the processing to step S1 of FIG. 30.

With the configuration described above with reference to FIGS. 30 and 31, the player can, after determining the target item to be moved (S6 of FIG. 30), move the target item to be moved freely within the screen 100 (S20 to S22 of FIG. 30) and switch the display area (S13 or S14 of FIG. 30). Then, after the above process, the player can move the target item to be moved freely within the screen 100 (within the new display area) (S20 to S22 of FIG. 30). Then, when the player cancels the determination of the item as being a target item to be moved (YES in S15), if the target item to be moved is a normal item (YES in S17), the target item to be moved can be positioned in the positioning area (typically, the closest positioning area to a position at which the target item to be moved is determined), in the new display area, associated with the position at which the target item to be moved is determined in the display area before the switching. As a result, even when the pointer 101 is grasping an item (target item to be moved), the pointer 101 can be moved freely, and when the display area is switched, the target item to be moved can be positioned in the positioning area in the display area after the switching associated with the position at which the target item to be moved has been positioned in the display area before the switching.

It should be noted that, in the processing of FIG. 30, the process (process of fixing the target item to be moved, and the like) of step S7 of FIG. 23 is not performed in the same manner as in the processing of FIG. 28, and thus, as in the same manner as in the processing of FIG. 28, it is preferable that the acceleration threshold used for determining whether the acceleration is greater than or equal to the predetermined value in steps S9 and S10 is set to a relatively great value.

Further, in the present embodiment described above, an item is positioned in a positioning area of a display area. However, for example, there is no positioning area in a display area, and an item may be positioned at any position in the display area. In this case, for example, the target item to be moved may be positioned at a position in a display area after the switching associated with the position in the display area at which the item has been positioned before the switching (that is, the same position on the screen 100 before and after the switching).

In the present embodiment described above, the pointer 101 is moved in accordance with the angular velocities detected by the unit-equipped controller 6. However, the pointer 101 may be moved in accordance with the acceleration detected by the unit-equipped controller 6, or may be moved based on the button (cross key, and the like) operation of the unit-equipped controller 6. Furthermore, the pointer 101 may be moved based on positions of the markers 8L and 8R captured by the imaging information calculation section 74 of the unit-equipped controller 6. That is, a device (pointing device) for moving the pointer 101 is not limited to gyro-sensors and may be acceleration sensors, an imaging apparatus, or the like.

Further, in the present embodiment described above, the display area is switched in accordance with the acceleration detected by the unit-equipped controller 6. However, the display area may be switched in accordance with the angular velocities detected by the unit-equipped controller 6. Further, the display area may be switched in accordance with the acceleration and the angular velocities detected by the unit-equipped controller 6.

Further, in the present embodiment described above, the case where there are three display areas A to C has been described as an example. However, the number of display areas may be any number as long as there is a plurality of display areas. Further, association among display areas (arrangement of the display areas) is not limited to that shown in FIG. 9, and may be, for example, in a matrix form. In this case, in accordance with a waving operation in up-down and left-right directions of the unit-equipped controller 6, the display image may be switched in the up-down and left-right directions.

Further, in the present embodiment described above, when the unit-equipped controller 6 is waved in the right direction, the display area is shifted in the right direction so as to be switched (see FIG. 15) while when the unit-equipped controller 6 is waved in the left direction, the display area is shifted in the left direction so as to be switched (see FIG. 12). However, the display area may be shifted in the left direction so as to be switched when the unit-equipped controller 6 is waved in the right direction and the display area may be shifted in the right direction so as to be switched when the unit-equipped controller 6 is waved in the left direction. Furthermore, the display area may be shifted in a predetermined direction (e.g., the right direction) when the unit-equipped controller 6 is waved in any direction (see the display areas A to C of FIG. 15).

Further, in the present embodiment described above, for ease of description, it is assumed that virtual cameras which capture a virtual space are fixed, and by moving a display area within the virtual space, the currently displayed display area on the screen 100 is switched. At this time, the positional relationships between the virtual cameras in the virtual space and each display area are relatively defined. Consequently, for example, the display area may be fixed in the virtual space and by moving the virtual cameras, the currently displayed display area on the screen 100 may be switched. In this case, it is assumed that the target item to be moved (and the pointer 101) is moved. Further, instead of capturing the virtual space by using the virtual cameras, display images (images of display areas, items, and the like) may be switched and displayed on the screen 100.

Further, in the present embodiment described above, the present invention is applied to the handheld game apparatus 3; however, the present invention is not limitedly applied to the game apparatus 3. For example, the present invention is applicable to a portable information terminal apparatus such as a mobile phone, a personal handyphone system (PHS), PDA, and the like. In addition, the present invention is also applicable to a stationary game apparatus, a personal computer, and the like.

Further, in the present embodiment described above, the above processing is performed on a single game apparatus 3; however, the above processing may be performed using a plurality of devices which are communicable with one another in a wired or wireless manner.

Further, in the present embodiment described above, the sequence of process steps used in the above information process is a mere example, and thus it is understood that another predetermined sequence, and the like may be employed within the scope of the present invention to realize the present invention.

The various information processing programs executed on the game apparatus 3 of the present embodiment described above may be provided to the game apparatus 3 through not only a storage medium such as an outside memory 44 but also through a wired or wireless communication line. Alternatively, the programs may be prestored in a nonvolatile storage apparatus provided in the game apparatus 3. It should be noted that an information storage medium for storing the programs may be an nonvolatile memory as well as a CD-ROM, a DVD, and a like optical disc-shaped storage media, a flexible disc, a hard disc, a magneto-optical disc, a magnetic tape, and the like. Further, an information storage medium for storing the programs may be a volatile memory which temporarily stores the programs.

While the invention has been described in detail, the foregoing description is in all aspects illustrative and not restrictive. It will be understood that numerous other modifications and variations (typically, modifications, and the like, in which the features of the respective embodiments are combined) can be devised without departing the invention.

What is claimed is:

1. A non-transitory computer-readable storage medium having stored therein an information processing program executed by a computer of an information processing apparatus for controlling an object displayed on a display device based on inputs from a movement sensor for detecting a movement and an input section, the information processing program, when executed, causing the computer to perform, at least, operations comprising:

displaying one of a plurality of areas on the display device as a display area;

determining an object included in the display area as a target to be moved based on an input from the input section;

when a predetermined movement is detected by the movement sensor, switching to another area different from the display area currently displayed as a new display area and displaying the another area on the display device together with the object determined as the target to be moved;

based on an input from the input section, cancelling a determination of the object as being a target to be moved; and when the determination is cancelled, positioning the object with respect to which the determination is cancelled in the new display area.

2. The non-transitory computer-readable storage medium having stored therein the information processing program according to claim 1, wherein the information processing program further causes the computer to perform:

based on an input from the input section, moving the object determined as a target to be moved within the display area, and when switching the currently displayed display area to the new display area and displaying the new display area on the display device together with the object determined as a target to be moved, displaying the object determined as a target to be moved at a position in the new display area which is the same position as a position of the object determined as a target to be moved in the currently displayed display area.

3. The non-transitory computer-readable storage medium having stored therein the information processing program according to claim 1, wherein when the determination of the object as being the target to be moved is cancelled, the object with respect to which the determination is cancelled is positioned at a position, in the new display area, associated with a position of the object at a time when the object is determined as a target to be moved.

4. The non-transitory computer-readable storage medium having stored therein the information processing program according to claim 1, wherein
when the determination of the object as being the target to be moved is cancelled, the object with respect to which the determination is cancelled is positioned at a position, in the new display area, associated with a position of the object determined as a target to be moved in the currently displayed display area immediately before switching the currently displayed display area to the new display area.

5. The non-transitory computer-readable storage medium having stored therein the information processing program according to claim 1, wherein
when the determination of the object as being the target to be moved is cancelled, the object with respect to which the determination is cancelled is positioned at a position, in the new display area, associated with a position of the object determined as a target to be moved in the new display area.

6. The non-transitory computer-readable storage medium having stored therein the information processing program according to claim 3, wherein
at least one positioning area in which the object can be positioned is set in each of the plurality of areas, and
when the determination of the object as being the target to be moved is cancelled, the object with respect to which the determination is cancelled is positioned in a positioning area, in the new display area, associated with a positioning area in the display area before switching, in which the object determined as a target to be moved has been positioned.

7. The non-transitory computer-readable storage medium having stored therein the information processing program according to claim 4, wherein
at least one positioning area in which the object can be positioned is set in each of the plurality of areas, and
when the determination of the object as being the target to be moved is cancelled, the object with respect to which the determination is cancelled is positioned in a positioning area, in the new display area, associated with a position of the object determined as a target to be moved in the currently displayed display area immediately before switching the currently displayed display area to the new display area.

8. The non-transitory computer-readable storage medium having stored therein the information processing program according to claim 5, wherein
at least one positioning area in which the object can be positioned is set in each of the plurality of areas, and
when the determination of the object as being the target to be moved is cancelled, the object with respect to which the determination is cancelled is positioned in a positioning area, in the new display area, associated with a position of the object determined as a target to be moved in the new display area.

9. The non-transitory computer-readable storage medium having stored therein the information processing program according to claim 1, wherein the information processing program further causes the computer to perform:
identifying a type of the object, and
when the determination of the object as being the target to be moved is cancelled, the object with respect to which the determination is cancelled is positioned at a position, in the new display area, associated with the type of the object with respect to which the determination is cancelled.

10. The non-transitory computer-readable storage medium having stored therein the information processing program according to claim 1, wherein
the object is fixed while the object is determined as the target to be moved, and
when the predetermined movement is detected by the movement sensor, switching to the another area different from the currently displayed display area as the new display area, in a state where the object determined as the target to be moved is fixed.

11. The non-transitory computer-readable storage medium having stored therein the information processing program according to claim 1, wherein
the information processing apparatus controls the object based on inputs from a first input device having the movement sensor and the input section.

12. The non-transitory computer-readable storage medium having stored therein the information processing program according to claim 11, wherein
the plurality of areas are associated with each other in advance in a predetermined sequence, and
when the predetermined movement is detected by the movement sensor, switching to an area associated with the currently displayed display area as the new display area and displaying the area on the display device together with the object determined as a target to be moved.

13. The non-transitory computer-readable storage medium having stored therein the information processing program according to claim 12, wherein
when the predetermined movement detected by the movement sensor is a movement in a first direction, switching to an area, which is associated with a currently displayed display area so as to immediately follow the currently displayed display area, as a new display area and displaying the area on the display device together with the object determined as a target to be moved, and
when the predetermined movement detected by the movement sensor is a movement in a second direction, switching to an area, which is associated with the currently displayed display area so as to immediately precede the currently displayed display area, as a new display area and displaying the area on the display device together with the object determined as a target to be moved.

14. The non-transitory computer-readable storage medium having stored therein the information processing program according to claim 12, wherein
the information processing apparatus controls the object displayed on the display device based on an input from a second input device having an additional movement sensor for detecting a movement,
when the predetermined movement is detected by the movement sensor, switching to an area which is associated with a currently displayed display area so as to immediately follow the currently displayed display area as a new display area and displaying the area on the display device together with the object determined as a target to be moved, and
when the predetermined movement is detected by the additional movement sensor, switching to an area which is associated with the currently displayed display area so as to immediately precede the currently displayed display area as a new display area and displaying the area on the display device together with the object determined as a target to be moved.

15. The non-transitory computer-readable storage medium having stored therein the information processing program according to claim 1, wherein
the input section includes a pointing device, and
based on an input from the pointing device, an object included in the display area is determined as a target to be moved.

16. The non-transitory computer-readable storage medium having stored therein the information processing program according to claim 1, wherein
the movement sensor detects at least one of an acceleration and an angular velocity, and
when an acceleration or an angular velocity which is greater than or equal to a predetermined value is detected by the movement sensor, switching to the another area different from the currently displayed display area as the display area and displaying the another area on the display device together with the object determined as the target to be moved.

17. An information processing apparatus for controlling an object displayed on a display device based on inputs from a movement sensor for detecting a movement and an input section, comprising:
a computer processing system, including at least one computer processor, the computer processing system being configured to control the information processing apparatus to perform operations comprising:
displaying one of a plurality of areas on the display device as a display area;
determining an object included in the display area as a target to be moved based on an input from the input section;
when a predetermined movement is detected by the movement sensor, switching to another area different from the display area currently displayed as a new display area and displaying the another area on the display device together with the object determined as the target to be moved;
based on an input from the input section, cancelling a determination of the object as being a target to be moved; and
when the determination is cancelled, positioning the object with respect to which the determination is cancelled in the new display area.

18. An information processing system for controlling an object displayed on a display device based on inputs from a movement sensor for detecting a movement and an input section, comprising:
a computer processing system, including at least one computer processor, the computer processing system being configured to control the information processing system to perform operations comprising:
displaying one of a plurality of areas on the display device as a display area;
determining an object included in the display area as a target to be moved based on an input from the input section;
when a predetermined movement is detected by the movement sensor, switching to another area different from the display area currently displayed as a new display area and displaying the another area on the display device together with the object determined as the target to be moved;
based on an input from the input section, cancelling a determination of the object as being a target to be moved; and
when the determination is cancelled, positioning the object with respect to which the determination is cancelled in the new display area.

19. An information processing method for controlling an object displayed on a display device based on inputs from a movement sensor for detecting a movement and an input section, comprising:
displaying one of a plurality of areas on the display device as a display area;
determining an object included in the display area as a target to be moved based on an input from the input section;
when a predetermined movement is detected by the movement sensor, switching to another area different from the display area currently displayed as a new display area and displaying the another area on the display device together with the object determined as the target to be moved;
based on an input from the input section, cancelling a determination of the object as being a target to be moved; and
when the determination is cancelled, positioning the object with respect to which the determination is cancelled in the new display area.

* * * * *